United States Patent [19]
Abrams et al.

[11] Patent Number: 5,637,329
[45] Date of Patent: Jun. 10, 1997

[54] PLASTICATOR AND SYSTEM FOR MOLDING PARTS

[75] Inventors: Fredric L. Abrams, Dayton; Robert F. Freund, Waynesville, both of Ohio

[73] Assignee: Modern Technologies Corp., Dayton, Ohio

[21] Appl. No.: 478,553

[22] Filed: Jun. 7, 1995

Related U.S. Application Data

[62] Division of Ser. No. 220,906, Mar. 31, 1994.

[51] Int. Cl.$^6$ .................................................. B29B 11/10
[52] U.S. Cl. .......................... 425/142; 264/142; 425/144; 425/164; 425/202; 425/208; 425/311; 425/377
[58] Field of Search .................................. 425/142, 143, 425/149, 147, 205, 209, 378.1, 407, 145, 206, 207, 562, 565, 309, 164, 311, 377, 583, 587; 264/40.5, 141–143, 328.18, 328.4

[56] References Cited

U.S. PATENT DOCUMENTS

| | | | |
|---|---|---|---|
| 1,743,299 | 1/1930 | Wiemer | 425/142 |
| 1,944,464 | 1/1934 | Richardson | 425/142 |
| 2,386,966 | 10/1945 | MacMillin | 264/453 |
| 2,683,895 | 7/1954 | Scofield | 425/192 R |
| 2,799,047 | 7/1957 | Widiger et al. | 425/587 |
| 3,078,513 | 2/1963 | Levison et al. | 425/146 |
| 3,283,041 | 11/1966 | Sommerfeld | 264/40 |
| 3,453,356 | 7/1969 | Kent, Jr. et al. | 264/143 |
| 3,499,186 | 3/1970 | Sassa | 425/4 R |
| 3,574,890 | 4/1971 | Gresch | 425/191 |
| 3,583,679 | 6/1971 | Godley | 425/202 |
| 3,728,056 | 4/1973 | Theysohn | 425/142 |
| 3,767,754 | 10/1973 | Manning et al. | 264/211.23 |
| 3,959,209 | 5/1976 | Lake | 260/40 R |
| 4,049,245 | 9/1977 | Tadmor et al. | 259/191 |
| 4,071,494 | 1/1978 | Gaylrod | 260/42.14 |
| 4,120,630 | 10/1978 | LaSpisa et al. | 425/142 |
| 4,197,070 | 4/1980 | Koschmann | 425/135 |
| 4,267,285 | 5/1981 | Broutman | 525/145 |
| 4,329,313 | 5/1982 | Miller et al. | 264/349 |
| 4,402,902 | 9/1983 | Falk et al. | 264/328.18 |
| 4,443,175 | 4/1984 | Rose | 264/328.4 |
| 4,500,595 | 2/1985 | Gerteisen et al. | 428/294 |
| 4,537,737 | 8/1985 | Crowe | 264/40.4 |
| 4,721,589 | 1/1988 | Harris | 264/40.1 |
| 4,804,505 | 2/1989 | Venzke | 264/40.1 |
| 4,863,653 | 9/1989 | Takubo et al. | 264/40.7 |
| 4,908,278 | 3/1990 | Bland et al. | 428/500 |

(List continued on next page.)

FOREIGN PATENT DOCUMENTS

| | | | |
|---|---|---|---|
| 0618060 | 10/1994 | European Pat. Off. | 425/209 |
| 60-264219 | 12/1985 | Japan | 425/587 |
| 62-240515 | 10/1987 | Japan . | |
| 1646880 | 5/1991 | U.S.S.R. . | |

OTHER PUBLICATIONS

Advertisement: RPM "Tomorrow's Thermoset Molding Today" for RPM–60 Reciprocating Screw Preplasticator for Thermosets.

*Primary Examiner*—Jeffery R. Thurlow
*Attorney, Agent, or Firm*—Jacox, Meckstroth & Jenkins

[57] ABSTRACT

A system is disclosed for molding parts. The system comprises a plasticator and press. The plasticator is capable of receiving a plurality of molding materials comprising a predetermined amount of a polyester, at least one other carbocylic and reinforcing fiber, such as glass fiber. The plasticator is characterized in that it is capable of simultaneously receiving contaminated molding materials and relatively long glass fibers and molding them into a billet wherein the fibers remain substantially undamaged. The billet is subsequently in a compression molding press where other materials may be molded or applied to its surface. The system is further characterized in that a single thermal rise is used to plasticate the molding materials. The system comprises a plasticator having a screw, a screw drive system, a plurality of heaters and control system to control the pressure and temperature in a barrel of the plasticator so as to create a billet having certain predetermined billet characteristics (such as a desired volume and/or density).

47 Claims, 17 Drawing Sheets

U.S. PATENT DOCUMENTS

| | | | |
|---|---|---|---|
| 4,937,028 | 6/1990 | Glemet et al. | 264/136 |
| 4,968,463 | 11/1990 | Levasseur | 264/40.1 |
| 5,088,910 | 2/1992 | Goforth et al. | 425/142 |
| 5,165,941 | 11/1992 | Hawley | 425/148 |
| 5,185,117 | 2/1993 | Hawley | 264/211.12 |
| 5,240,663 | 8/1993 | Stringaro et al. | 425/142 |
| 5,275,776 | 1/1994 | Hara et al. | 264/257 |
| 5,324,755 | 6/1994 | Kilius et al. | 523/214 |
| 5,344,299 | 9/1994 | Takeuchi | 425/142 |
| 5,358,397 | 10/1994 | Ligon et al. | 425/149 |
| 5,358,680 | 10/1994 | Boissonnat et al. | 264/328.18 |
| 5,421,712 | 6/1995 | Laing et al. | 425/149 |

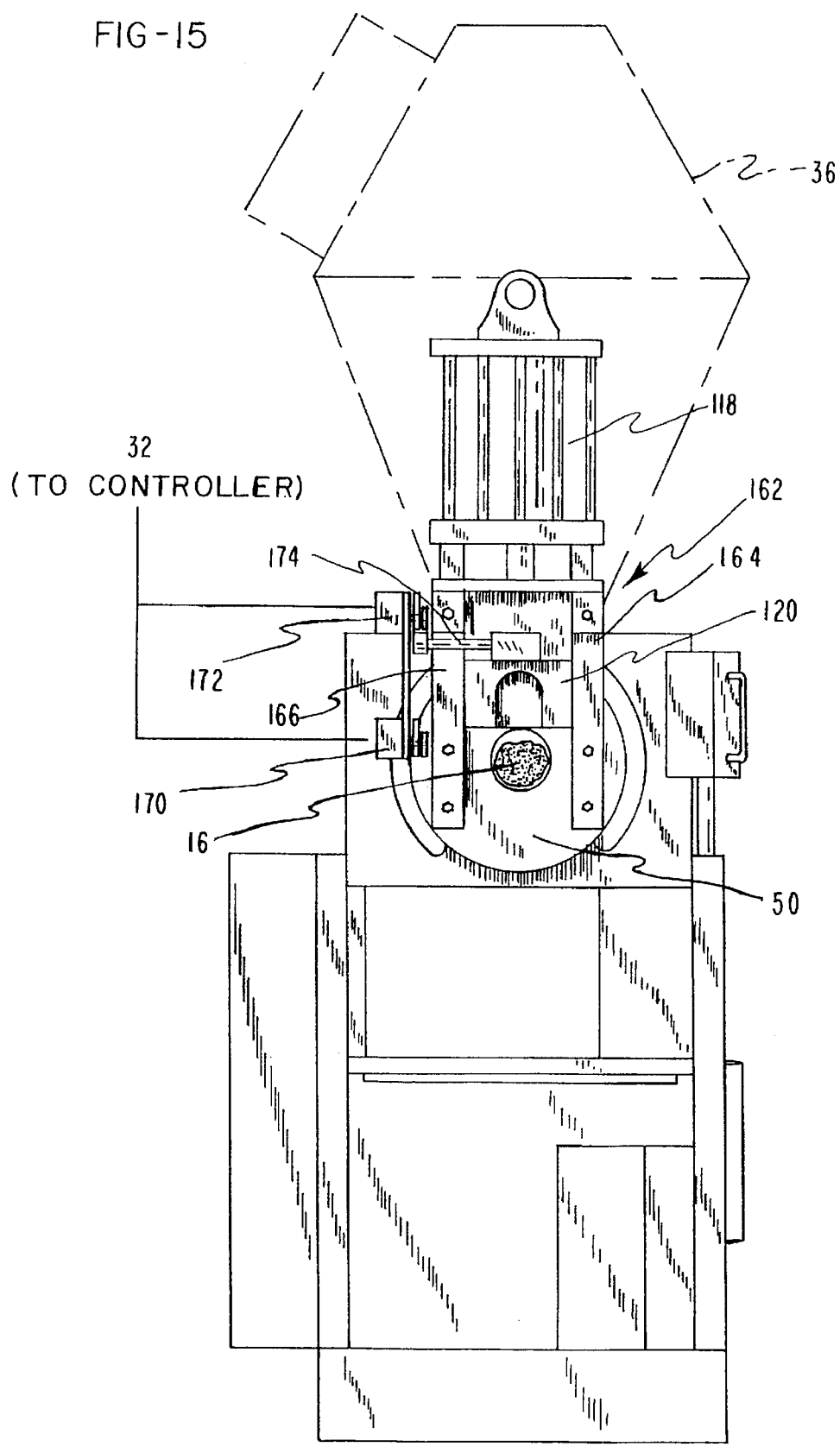

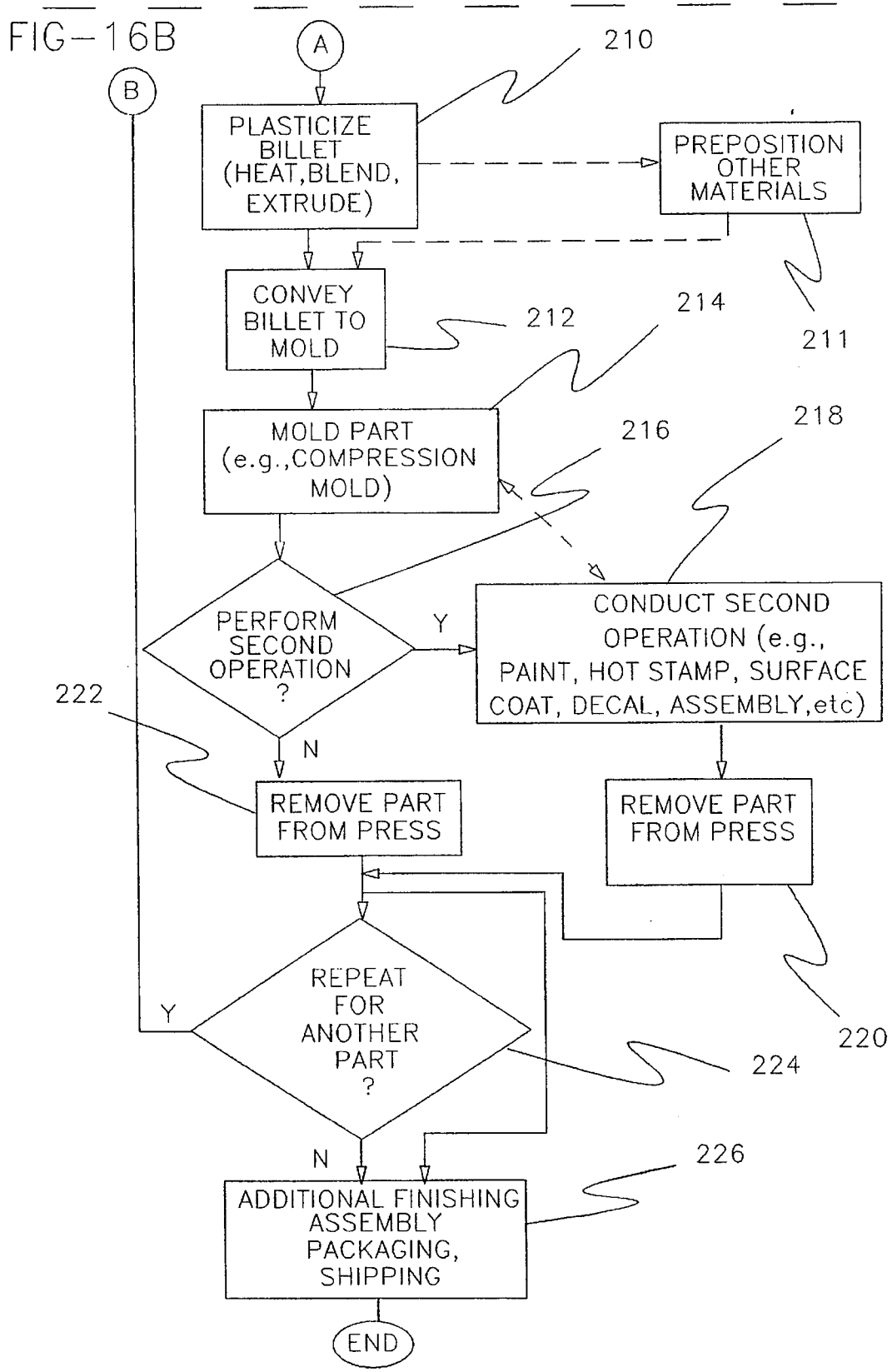

PLASTICATOR AND SYSTEM FOR MOLDING PARTS

RELATED APPLICATION

This application is a division of copending Ser. No. 08/220,906 filed Mar. 31, 1994.

BACKGROUND OF THE INVENTION

1. Field of the Invention

This invention relates to a system and method for molding parts, and more particularly, a system and method for molding parts from contaminated molding materials using a single thermal heat rise.

2. Description of Related Art

In the field of thermoplastic molding, it is common to mold parts using either an injection or compression molding process. Due to the size of the orifices used in the injection molding equipment, it is often difficult to injection mold with reinforcing fibers, such as glass fibers, having a length over one-eighth inch because such fibers are not easily injected into or conveyed through the injection mold equipment. In addition, it is difficult to use contaminated molding materials such as those collected in plastics recycling programs unless they have been substantially cleaned, processed and put into a usable form and size prior to being used in the injection molding equipment. Such cleaning and processing are expensive and can substantially increase the cost of using the contaminated materials, thereby making them economically impractical.

Another problem with the thermoplastic processes of the past is that the thermoplastics become degraded and lose, for example, their strength when exposed to multiple heat rises.

In general, there are two basic types of compression molding processes which may be used for molding thermoplastics. First, a sheet molding process involves placing a reinforcement, such as a glass mat, between sandwiching layers of a thermoplastic and heating the materials to produce a single sheet of material. The single sheet of material is then cut to the desired size and then reheated to molding temperature before being placed in a compression molding press. This process has the disadvantage of higher cost because of the apparatus required, the material handling costs incurred in making the sheet, handling and cutting the sheet, and the like. The material used to make the sheet is also subject to three thermodynamic cycles, a first cycle when the thermoplastic sheet is formed, a second cycle when the thermoplastic sheets and glass mat are molded together, and a third cycle when the resulting sheet is heated to molten temperature prior to molding the part.

The second form of thermoplastic compression is bulk molding compounds by producing a billet of molten material that is placed into a compression molding press which molds the molten material into a part. Effectively placing and distributing long reinforcing fibers in the billet has heretofore required complex machinery. For example, U.S. Pat. No. 5,165,941 issued to Ronald C. Hawley on Nov. 24, 1992, discloses an extruder apparatus and process for compounding thermoplastic resin and fibers. The Hawley extruder includes an apparatus for compounding thermoplastic resin and reinforcing fibers incorporating a resin extruder in which thermoplastic resin pellets are melted in a second, compounding, extruder in which the molten thermoplastic resin is mixed in intimate contact with long reinforcing fibers. The melted thermoplastic resin is not fed into the device with the fibers, but rather is introduced into the compounding extruder at a point downstream of the inlet point for reinforcing fibers, so that the fibers are mechanically worked and heated before coming into contact with heated, molten thermoplastic resins.

The Hawley device generally suffers from complexity that raises the investment and maintenance costs.

The compression molding of products using polymeric material and glass fibers has traditionally produced a material referred to as fiber glass reinforced plastic. This material exhibits characteristics better than the unreinforced plastics, but does not exhibit strength, elasticity or impact resistance comparable to thermoplastic materials which are specifically designed to exhibit these characteristics. Most fiberglass reinforced plastic currently in the market is thermoset and is essentially a solidified mixture of fiber glass and plastic without benefit of chemical bonding or specific methods of enhancing polymer entrapment of the glass fibers because the glass fibers are merely immobilized in the resin in which it is embodied.

In addition, thermoset materials are generally not recyclable other than as filler materials, while thermoplastic materials can be remelted and remolded.

What is needed, therefore, is an apparatus and method for molding thermoplastic parts which is simple and economical and which preserves the length of the reinforcing fibers, evenly distributes the reinforcing fibers or any other filler materials while maintaining flexibility of the material type in products fabricated, is capable of compatibilizing various contaminated thermoplastics to allow use of post consumer recycled material, and which provides a compounding and fabrication environment which promotes chemical bonding and molecular orientation to enhance the characteristics of the molded part.

SUMMARY OF THE INVENTION

It is therefore a primary object of this invention to provide a method and apparatus which facilitates overcoming one or more of the aforementioned problems.

In one aspect of the invention, this invention comprises: a plasticator for creating a billet of moldable material including a feeder for receiving a plurality of molding materials comprising a predetermined amount of a polyester, other carbocylics and reinforcing fibers, and a suspender coupled to said feeder for receiving the molding materials, for creating a molten suspension of said molding materials without damaging a substantial number of the reinforcing fibers, and also for creating the billet.

In another aspect of the invention, this invention comprises: a method for creating a billet for molding a part comprising the steps of (a) loading a plasticator with molding materials, the molding materials comprising a polyester, other carbocylics and reinforcing fibers; (b) heating the molding materials to a predetermined temperature; (c) blending the molding materials in order to create a molten suspension wherein a majority of the reinforcing fibers remain generally undamaged; and (d) extruding the molten suspension in order to form a billet having preselected billet characteristics.

In yet another aspect, this invention comprises: a plasticator for creating a billet from a plurality of molding materials, the plasticator comprising plasticating means for receiving the molding materials and for creating a molten suspension of the molding materials; and control means associated with the plasticating means for controlling the suspension characteristics applied to the molding materials in order to plasticate the plurality of molding materials into a billet having predetermined billet characteristics.

In still another aspect, this invention comprises: a system for molding a part comprising a plasticator for creating a billet from a plurality of molding materials, the plasticator comprising plasticating means for receiving the molding materials and for creating a molten suspension of the molding materials, control means associated with the plasticating means for controlling the suspension characteristics applied to the molding materials in order to plasticate said plurality of molding materials into a billet having predetermined billet characteristics; and a press having a mold for receiving the billet and for molding the billet into the part.

In yet another aspect, this invention comprises: a plasticating process comprising the steps of loading a plasticator with a plurality of molding materials, creating a mixture with the plurality of molding materials in the plasticator, and plasticating the mixture of the plurality of molding materials at a controlled temperature and pressure in order to create a billet having predetermined billet characteristics.

In a still further aspect, the invention comprises: a screw for use in a plasticator having a barrel, said screw comprising a root and a plurality of threads configured to permit a polyester, other carbocylics and a plurality of reinforcing fibers to be mixed to provide a billet having predetermined billet characteristics without damaging a substantial number of the reinforcing fibers.

It is an object of this invention to provide a system and method for using long reinforcing fibers that can be loaded simultaneously along with the thermoplastics being used.

Another object is to facilitate providing a system and method which is simple and economical and which provides a process that generally preserves the length of the reinforcing fibers through the plasticating and molding process.

Another object of this invention is to provide a method and apparatus which evenly distributes any filler materials, such as reinforcing fibers, which are used in the apparatus and method.

Still another object of the invention is to provide a method and apparatus which facilitates using contaminated molding materials which have heretofore been undesirable for use because of their contamination or because they are expensive to clean sufficiently for use.

Still another object of this invention is to provide a method and apparatus which facilitates or enhances chemical bonding and molecular orientation of the polymer molding materials being used.

These objects and others will be more apparent when the following description is read in conjunction with the claims and drawings.

BRIEF DESCRIPTION OF THE DRAWINGS

FIG. 15 is a view similar to FIG. 14 showing a knife activated to a fully open position; and FIG. 16a and 16b, taken together, are schematic diagrams showing a process according to an embodiment of the invention.

DETAILED DESCRIPTION OF A PREFERRED EMBODIMENT

Figure 1:
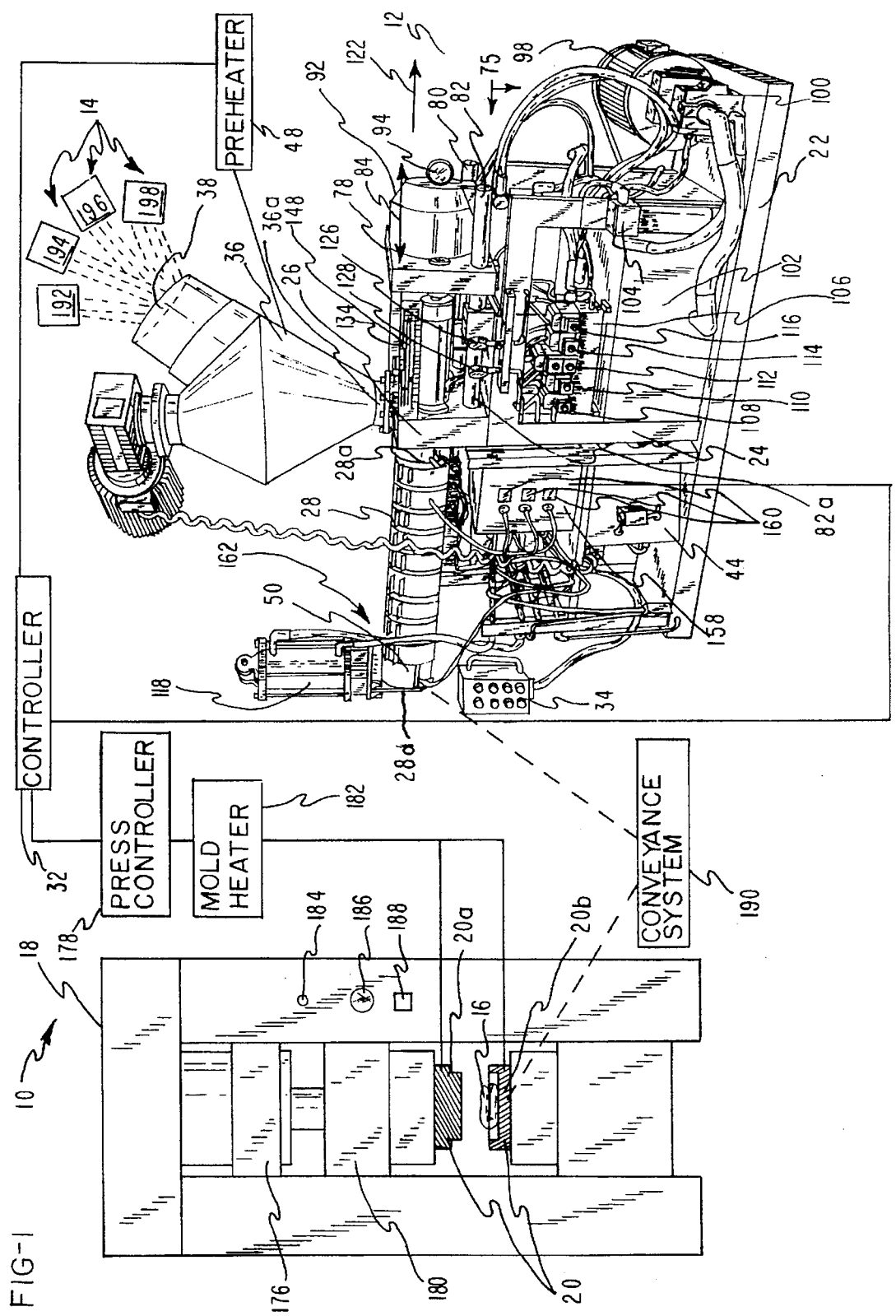
FIG. 1 is a view of a system according to one embodiment of the invention, comprising a plasticator and a press.

Referring now to FIG. 1, a system 10 for molding a part is shown. The system 10 comprises a plasticator 12 for receiving a plurality of molding materials 14 and also for plasticating the molding materials 14 into a billet 16. The system 10 also comprises a press 18 associated with the plasticator 12 for receiving the billet 16 and for molding the billet 16 into the part (not shown) defined by a mold 20.

The plasticator 12 comprises a base 22 which supports the various components of the plasticator 12. The base 22 has a support column 24 which supports a stationery block 26. The plasticator 12 comprises a suspender or barrel 28 having a feeding end 28a mounted to the stationery block 26. The plasticator 12 also comprises a screw 30 (FIG. 3) which is rotatable and axially mounted in barrel 28 as described below.

The system 10 comprises a controller/micro-processor 32 for controlling the operation of the plasticator 12 and press 18. The controller 32 includes an operator control box 34 for interfacing with controller 32. A suitable controller is the Model Slick 150 manufactured by Allen Bradley of Fairfield, N.J., but it should be understood that any suitable controller which is capable of controlling the operation of the system may be used.

As best illustrated in FIG. 1, the plasticator 12 further comprises feeding means or a feed hopper 36 having an opening 38 for receiving the molding materials 14. The feed hopper opening 38 may be directly connected to a supply system (not shown) for moving materials from a storage or drying area (not shown) to the system 10. The feed hopper 36 may include an agitator 40 (FIG. 2) for facilitating agitating and mixing the molding materials 14. The agitator 40 is coupled to a drive motor 42 which in turn is coupled to a control box 44 which controls the speed and operation of the drive motor 42. In one embodiment, the control box 44 is coupled to controller 32, thereby permitting the controller 32 to control the operation of the drive motor 42. The drive motor is an electric drive motor, but it could be any suitable type of motor for driving the agitator, such as a hydraulic or pneumatic motor.

The feed hopper 36 has an end 36a coupled to stationery block 26 so that the molding materials 14 may be fed into a feeding opening 46 (FIG. 3) in the feeding end 28a of barrel 28.

The feeding means or feed hopper 36 may comprise a preheater 48 (FIG. 1) which is coupled to controller 32 for preheating the molding materials 14 to a preheated temperature before the molding materials 14 are introduced into the feeding opening 46 in barrel 28. In the embodiment being described, the preheater 48 may preheat the molding materials 14 in feed hopper 36 to between 100 and 300 degrees Fahrenheit, depending on the molding materials 14 selected and used. Although not shown, the feed hopper 36 may be insulated to facilitate maintaining the temperature in the feed hopper at the preheated temperature.

The suspender or barrel 28 has a feeding end 28a and also an extruding end 28b from which billet 16 is extruded. In one embodiment, the barrel 28 is approximately four feet long and has an outside diameter of approximately eight inches and an inside diameter of approximately four inches. The barrel 28 is manufactured from hardened steel and weighs approximately 300 pounds. The barrel may have a die 50 located at the extruding end 28b. The function of the die 50 is to cause the billet 16 to be extruded into a predetermined shape or diameter. For example, the billet 16 may be extruded so that its cross-sectional diameter is approximately 2.0 inches.

As illustrated in FIGS. 3–10, the barrel 28 comprises a feeding portion 54, a blending portion 56 and an extruding portion 58. The plasticator 12 also comprises the screw 30 which is rotatively and axially mounted in a passageway 52 defined by barrel 28. Notice that screw 30 comprises a feeding end 30a and an extruding end 30b. The screw 30 further comprises a feeding section 60 associated with the feeding end 30a, a blending section 62, and an extruding section 64 associated with extruding end 28b. The feeding section 60, blending section 62 and extruding section 64 of screw 30 become generally associated with the feeding portion 54, blending portion 56 and extruding portion 58, respectively, of barrel 28 when the screw 30 is located in a home position generally shown in FIGS. 3–5.

The feeding section 60 comprises a first plurality of threads 66. The blending section 62 comprises a second plurality of threads 68, and the extruding section 64 comprises a third plurality of threads 70.

Figure 2:
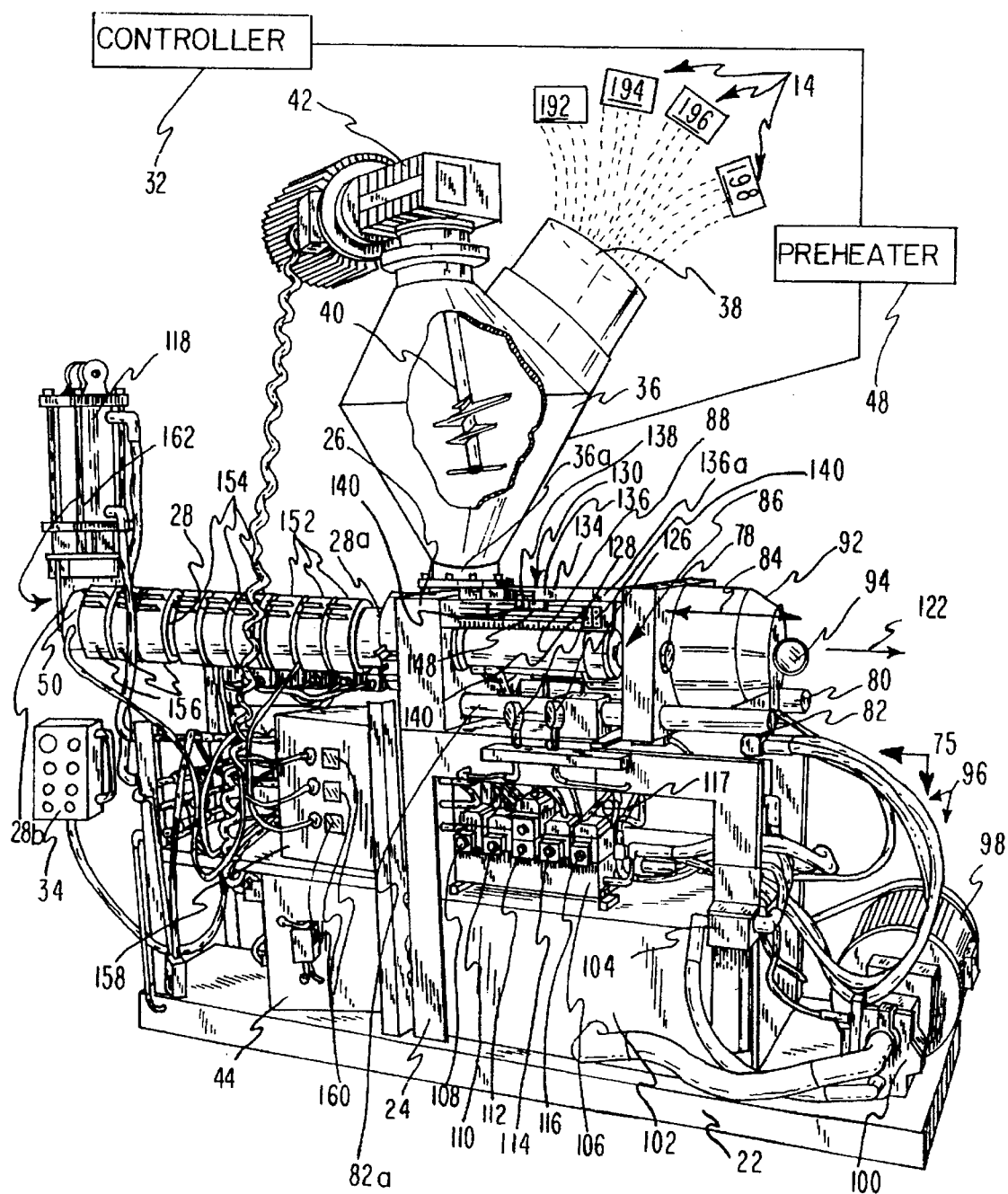
FIG. 2 is a fragmentary view of the plasticator shown in FIG. 1.
Figure 3:
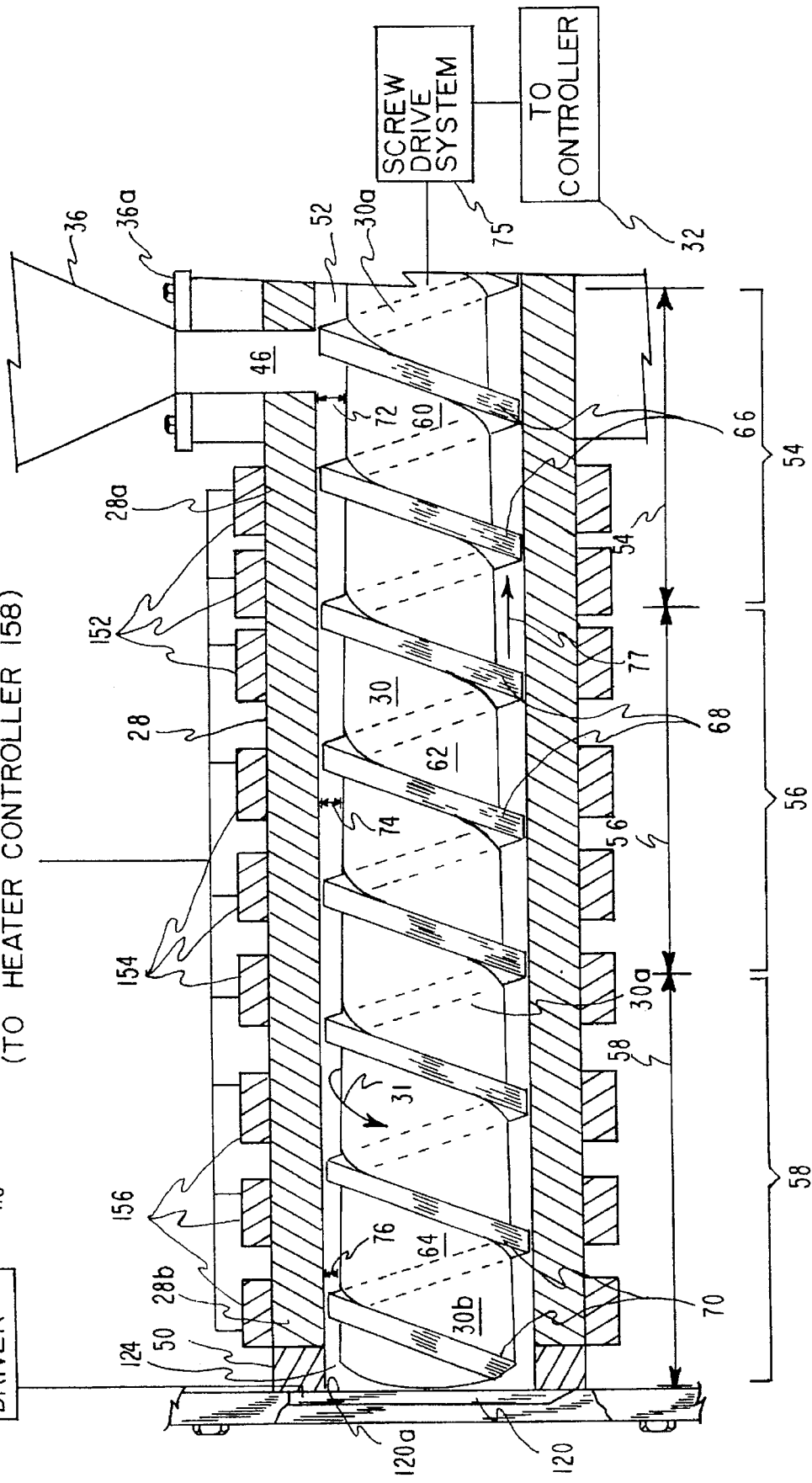
FIG. 3 is a fragmentary sectional view showing a screw positioned in a barrel which may be used in the plasticator shown in FIGS. 1 and 2.

As illustrated in FIG. 3, the first plurality of threads 66 have a depth, identified by double arrow 72, which is generally greater than the depth, identified by double arrow 74, of the second plurality of threads 68 associated with the blending section 62 of screw 30. The first and second plurality of threads 66 and 68 may have a depth which is greater than the depth 76 of the third plurality of threads 70 associated with extruding section 64. It is to be noted that screw 30 comprises a shaft or a root or core 30d about which the first, second and third plurality of threads 66, 68 and 70 are located. As best illustrated in FIGS. 2 and 3, the core 30a may be generally tapered to provide a screw depth that generally decreases from the feeding end 30a to the extruding end 30b. This facilitates ensuring that the depth 72 of the first plurality of threads 66 is generally greater than the depth 74 of the third plurality of threads 70.

Figure 4:
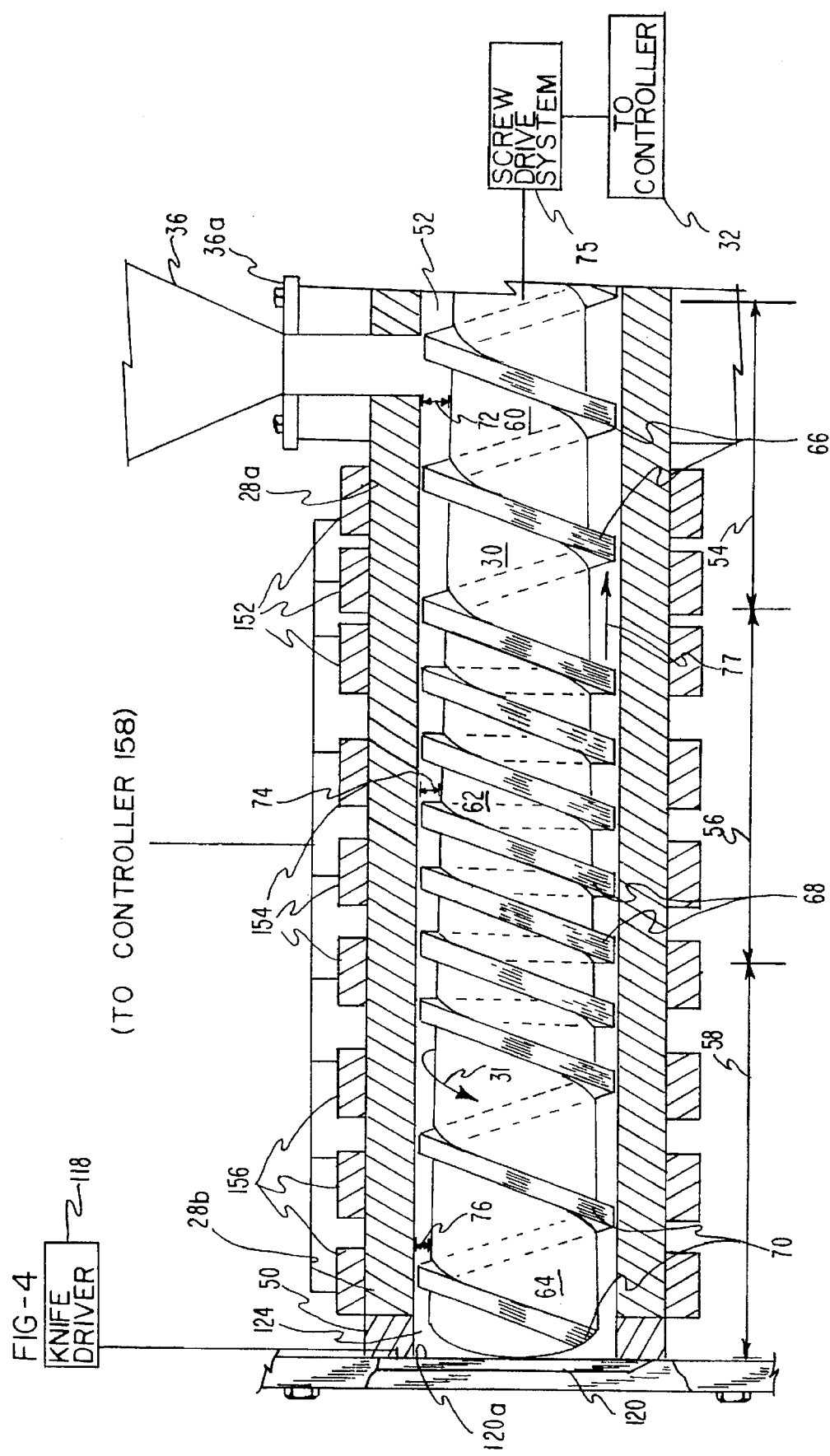
FIG. 4 is a view similar to FIG. 3 showing a screw having a plurality of pitch diameters or distances.

Another embodiment of the screw 30 is shown in FIG. 4. In this embodiment, the second plurality of threads 68 are provided with a greater number of threads (i.e., a smaller pitch or distance between threads) than the first plurality of threads 66. The embodiments shown in FIGS. 3 and 4 facilitate controlling the mixture and suspension time of the molding materials 14 and, further, mixing the molding materials 14 with a predetermined pressure and shear, without significantly damaging the molding materials 14 as the screw 30 rotates.

In one embodiment the screw 30 is approximately 100 inches long and has a core 30a diameter of approximately 3.7 inches. The screw 30 is a left-hand screw, and the depths 72, 74 and 76 are 0.8 inch, 0.75 inch, and 0.6 inch, respectively. The blending section 62 of screw 30 has about 30% more turns in FIG. 4 when compared to the feeding section 60.

The plasticator 12 also comprises means for driving screw 30 or a screw drive system 75 for rotatably and axially driving the screw 30 in a passageway 52 (FIG. 3) of barrel 28. The screw drive system 75 is capable of controlling the rotational and axial movement of screw 30 in the barrel 28 in order to facilitate mixing the molding materials 14 into a molten suspension and ultimately, into billet 16 having certain predetermined characteristics. When the mixed molten suspension achieves the predetermined characteristics, such as a predetermined volume, density, viscosity, or size as indicated by predetermined temperature and pressure, then screw 30 is allowed to withdraw in the direction of arrow 76 in FIG. 3 to permit the suspension to be formed into the billet 16 at a storage or extruding area 124 of barrel 28. As described below, the screw drive system 75 is also capable of controlling the rotational speed of screw 30 and the axial movement of screw 30 until the desired predetermined characteristics are achieved.

The screw drive system 75 (FIG. 2) comprises means coupled to screw 30 for rotatably driving screw 30 and also for axially driving screw 30 into and out of passageway 52 (FIG. 2) in barrel 28. The means comprises a slidable block 78 which is slidably mounted on a pair of stationary column supports 80 and 82, each having an end secured to stationary block 26. The means also comprises suitable bearings (not shown) located in slidable block 78 for facilitating the axial movement of slidable block 78 in the direction of double arrow 84 in FIG. 2.

Figure 11:
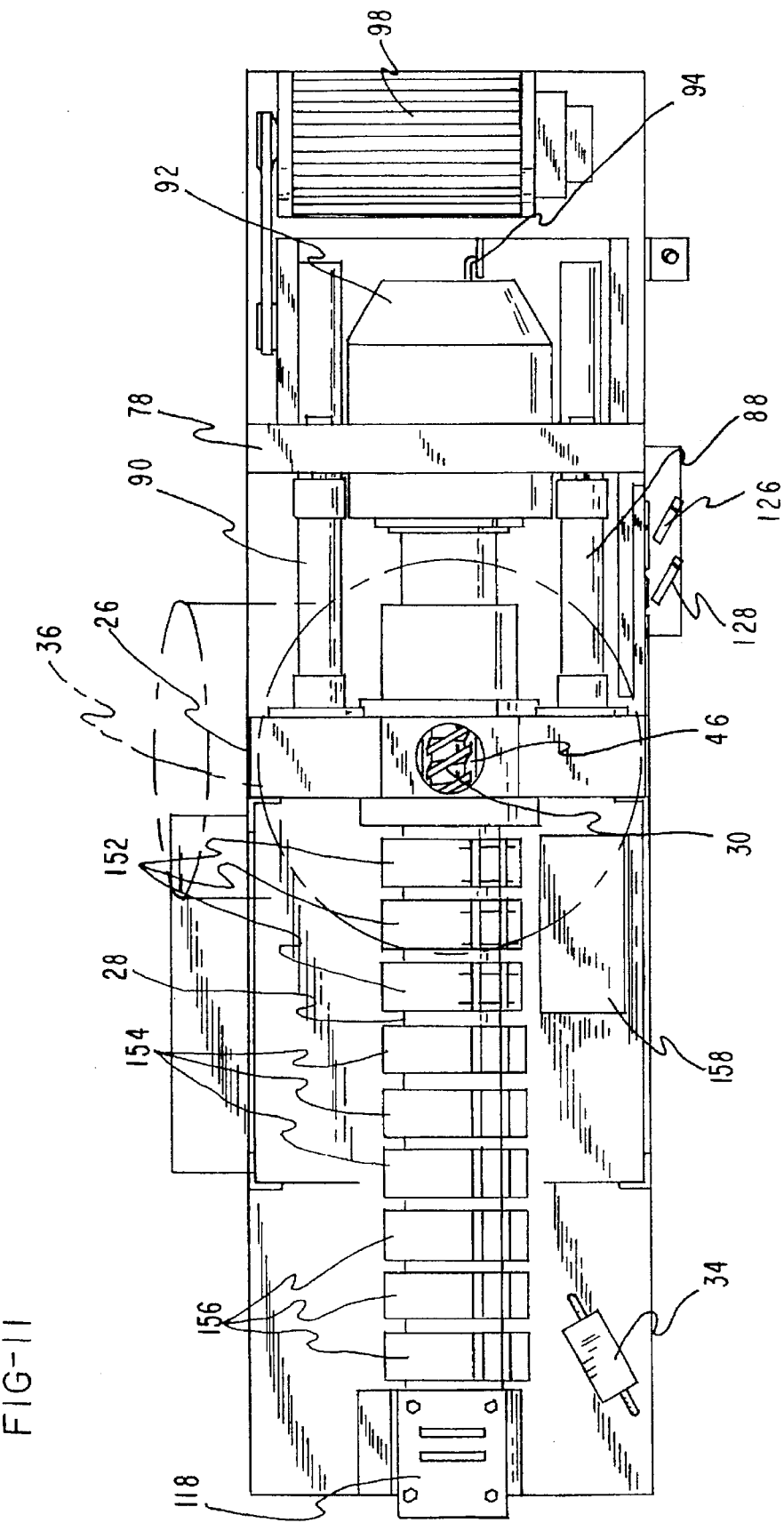
FIG. 11 is a top view showing a screw drive system in a home position.
Figure 12:
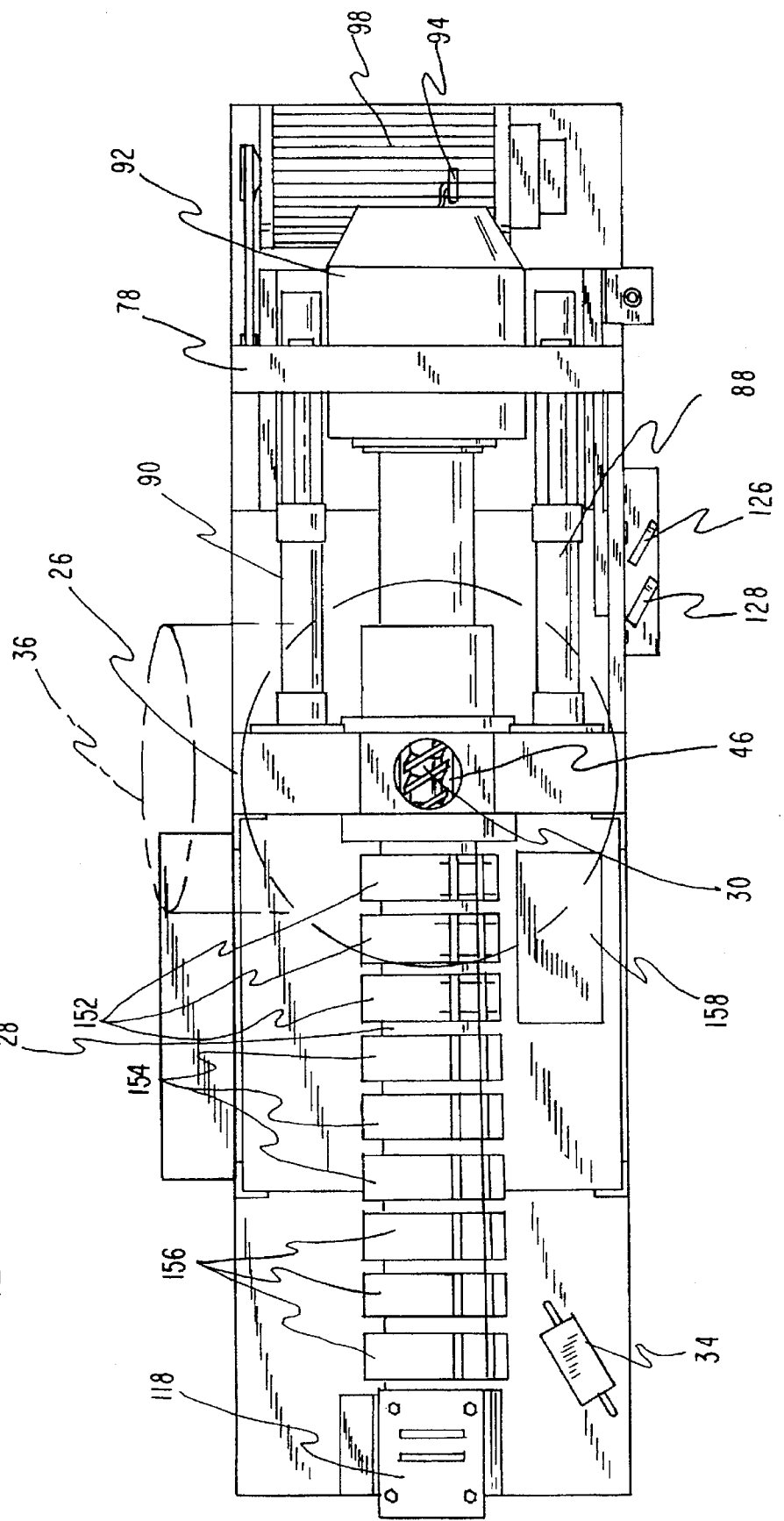
FIG. 12 is a view similar to FIG. 11 showing the screw drive system withdrawing the screw from the barrel.
Figure 13:
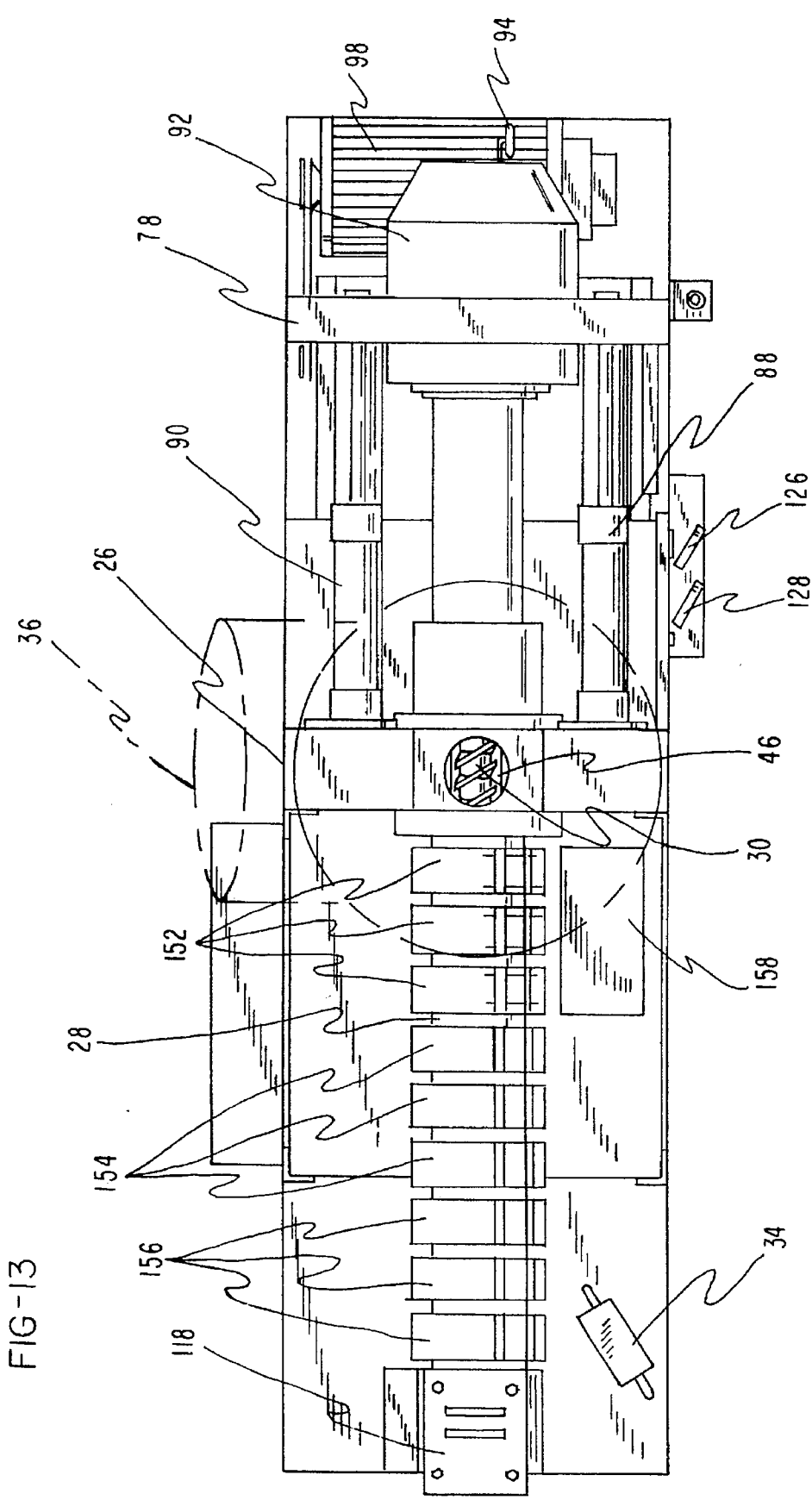
FIG. 13 is another view showing the screw drive system after it has withdrawn the screw further from the barrel.

The screw drive system 75 also comprises a block driver 86 for slidably driving the slidable block 78 in the direction of double arrow 84. In the embodiment being described, the block driver 86 comprises a pair of push/pull hydraulic cylinders 88 and 90 (FIGS. 11–13). The screw drive system 75 also comprises a drive motor 92 which is coupled to screw 30 and which rotatably drives screw 30 in either a clockwise or counterclockwise direction as desired. In the embodiment being described, the drive motor 92 is a hydraulic motor which is capable of rotating screw 30 at approximately 0 to 100 RPM's.

The screw drive system 75 may comprise first sensing means or sensor 94 for sensing the RPM's of drive motor 92. First sensing means 94 may also include a torque sensor (not shown) which is coupled to controller 32 and which monitors or senses the torque of screw 30 as it produces the billet 16.

The plasticator 12 comprises power means or a power system 96 for energizing drive motor 92 and block driver 86. In the embodiment being described, the power system 96 comprises an electric motor 98 which drives a hydraulic pump 100. The hydraulic pump 100 pumps oil from a reservoir 102 through filter 104 into control means or control block 106. The control block 106 comprises pressure valves 108, 110, 112, 114 and 116 which control the delivery of fluid to cylinders 88, 90, drive motor 92 and to a knife driver 118 as described below. The pressure valves 108, 110, 112, 114 and 116 are coupled to controller 32 which is capable of controlling their operation as described below.

The power system 96 may comprise a plurality of variable pressure regulators, such as regulator 117, which may be positioned between the drive motor 92, cylinders 88 and 90 and their respective pressure valves in order to facilitate controlling the hydraulic pressure delivered thereto. For example, the pressure regulator associated with the cylinders 88 and 90 can be adjusted so that the pressure delivered to cylinders 88 and 90 can be varied. One suitable pressure regulator is the Vickers regulator, manufactured by Vickers of Troy, Mich. This permits an operator to vary the amount of pressure at which the slidable block 78 is biased towards the stationary block 26.

Figure 5:
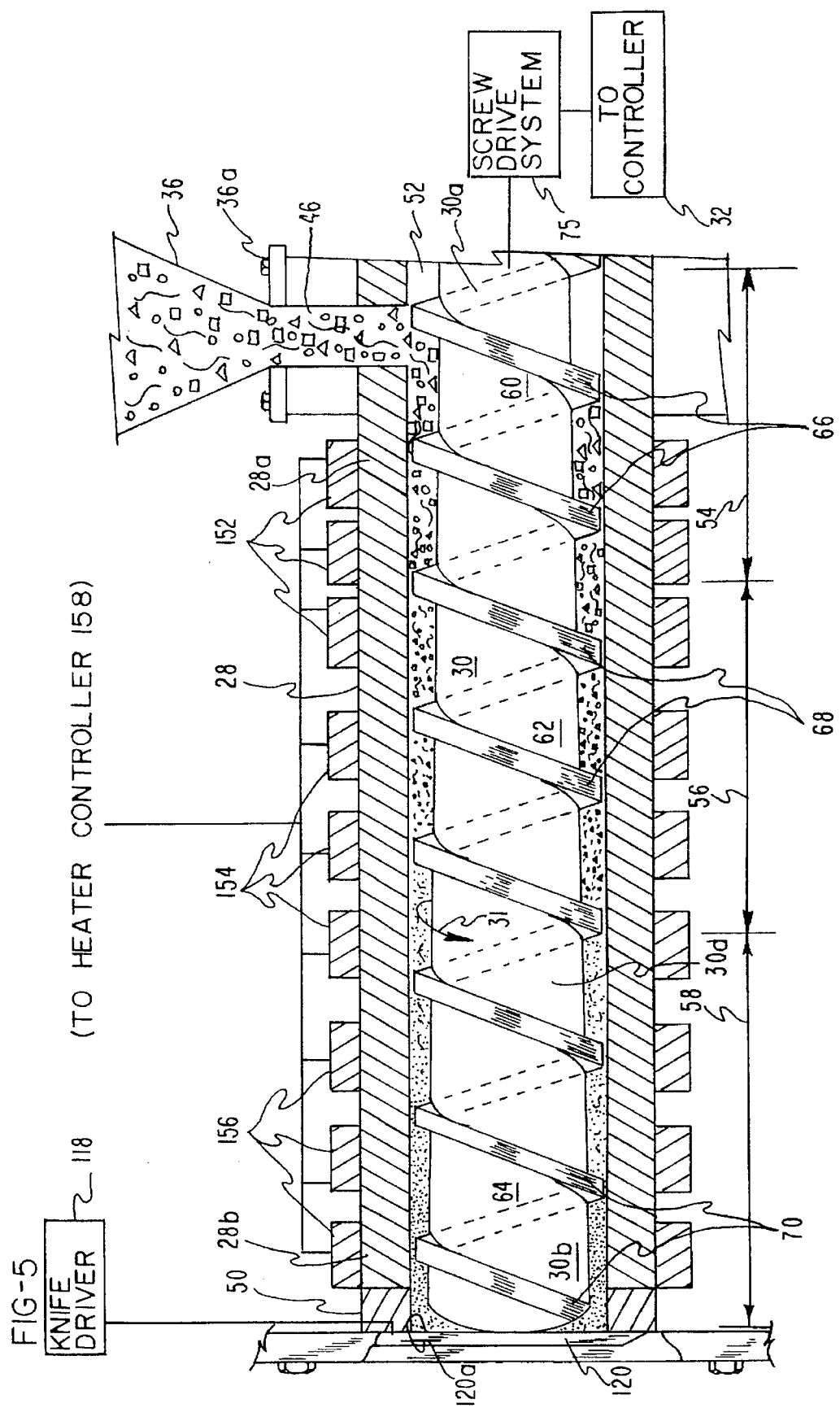
FIG. 5 is a sectional view showing the beginning of the plasticating process.

As the screw drive system 75 drives and forces molding materials 14 into a storage area 124 (FIG. 3) associated with the extruding portion 58 of barrel 28, the pressure in the barrel 28 begins to build. Such pressure increases as more of the molten suspension of molding materials 14 are forced and driven into the storage area 124. When such pressure reaches or exceeds the predetermined pressure being delivered to cylinders 88 and 90, the pressure causes screw 30 to withdraw from passageway 52 as shown in FIGS. 3–5. Consequently, by controlling the pressure delivered to cylinders 88 and 90, the density, volume and viscosity of the molten suspension and the billet 16 can be accurately controlled. By adjusting the pressure delivered to cylinders 88 and 90, the viscosity, volume and density of the molten suspension and billet 16 can be made to conform to the desired material characteristics and controlled. Although not shown, other types of regulators may be used. For example, electronic or pneumatic regulators may be provided which is coupled to controller 32 for automatically adjusting the pressure delivered to cylinders 88 and 90 and drive motor 92.

As best illustrated in FIG. 2, the system 10 also comprises sensing means or a second sensor for sensing the pressure in the power system 96. In the embodiment being described, the sensing means comprises a pressure gauge 126 for measuring the pressure being delivered by the hydraulic pump 100. In addition, sensing means also comprise pressure gauge 128 for sensing the pressure being delivered to cylinders 88 and 90. Although not shown, it should be appreciated that sensing means could comprise any suitable hydraulic, electronic or other suitable means which are capable of sensing the pressure being delivered by control block 106 to drive motor 92, knife driver 118, and cylinders 88 and 90.

Figure 14:
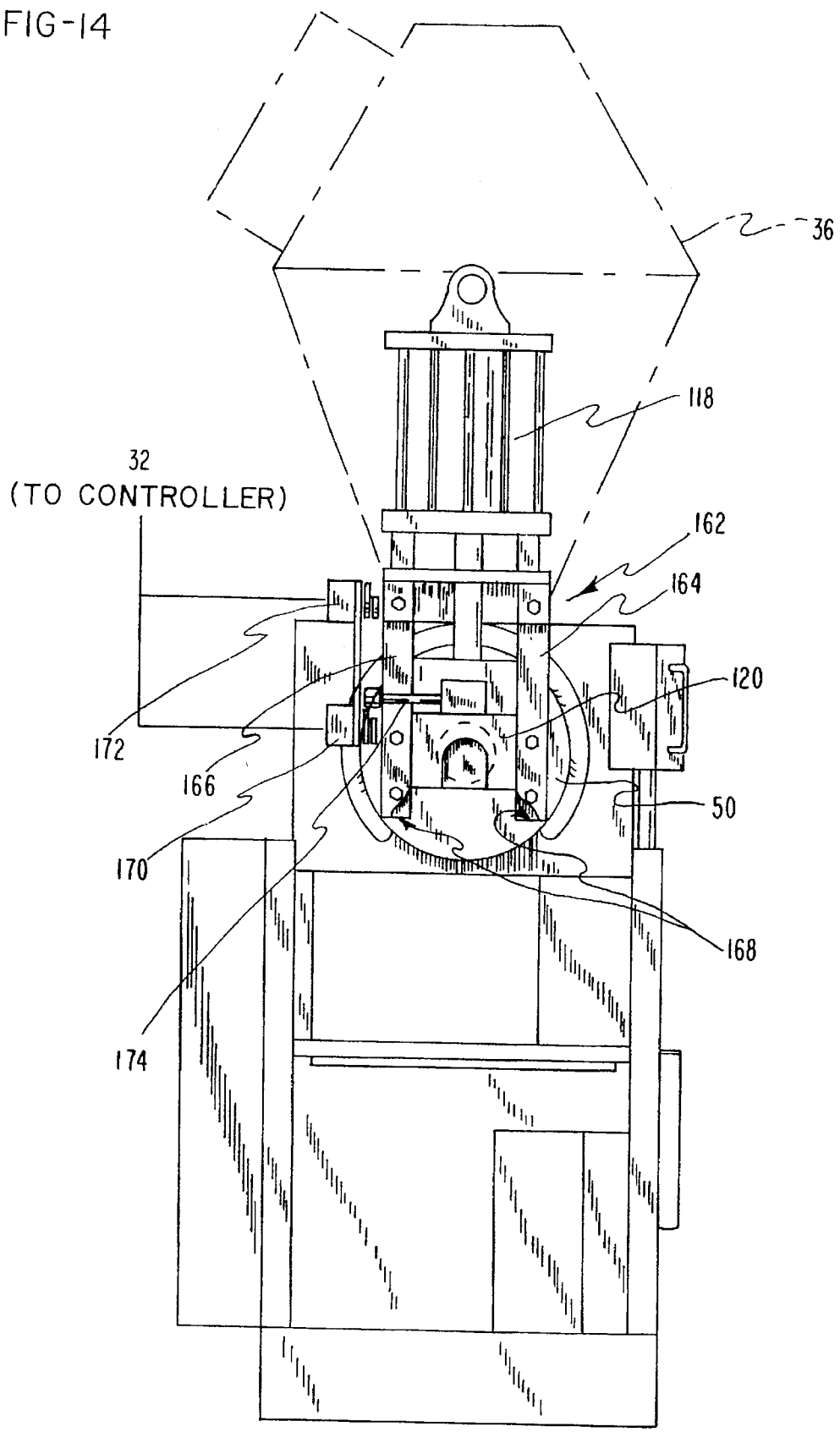
FIG. 14 is an end view of the plasticator showing a knife assembly used in the plasticator.

The plasticator 10 also comprises an adjustable distance sensor 130 which senses the travel distance of screw 30 as it withdraws from the passageway 52 of barrel 28. When the actual travel distance reaches a preset distance, the distance sensor 130 generates a distance signal which is received by controller 32. Upon receipt of the distance signal, controller 32 energizes pressure valves 108, 110, 114 and 116 to shut the fluid pressure being delivered to cylinders 88, 90 and drive motor 92. As described later herein, controller 32 may then energize pressure valve 112 to deliver fluid to knife driver 118 in order to drive knife blade 120 into the open position shown in FIGS. 9 and 15. Controller 32 may then energize control block 106 and pressure valve 108 to actuate hydraulic cylinders to pull or slidably drive slidable block 78 towards stationary block 26 which causes the molten suspension to be extruded out of extruding opening 132 (FIG. 9) associated with the extruding end 28b of barrel 28. Controller 32 may then energize knife driver 118 to force knife blade back into the closed position shown in FIGS. 10 and 14, thereby severing the molten suspension to provide billet 16.

It should be noted that the distance sensor 134 comprises a bracket 136 which has an end 136a secured to slidable block 78. The distance sensor 134 also has a switch 138 secured to the bracket 136. A plurality of contact switches are slidably mounted on a panel 148 (FIG. 1) which is secured to stationary block 26. The panel 148 has distance indicia thereon, and the contact switches 140 can be slidably adjusted on the panel 148 to generally correspond to the volume of the billet 16 to be extruded from barrel 28. Thus, as slidable block 78 moves in the direction of arrow 122 and thereby causes screw 30 to withdraw from passageway 52, contact switch 140, for example, contacts switch 138, thereby generating the distance signal which is received by controller 32. Although not shown, it should be appreciated that the distance sensor could be any suitable means for measuring the size, including volume, of the billet 16 which is being created. For example, other suitable electrical, optical, hydraulic, pneumatic, or other types of sensors may be employed for measuring the distance the screw 30 and block 78 travels.

The system 10 comprises heating means or a heater for plasticating the molding material 14 using a single thermal cycle from introduction of materials 14 to molding a part or product from billet 16. As illustrated in FIGS. 1 and 2, the plasticator 10 comprises heating means or a heater system, 150, in the embodiment being described, which comprises three sets of resistance or heating bands 152, 154 and 156. The heating bands 152, 154 and 156 on the barrel 28 are associated with the feeding portion 54, blending portion 56 and extruding portion 58, respectively, as illustrated in FIGS. 3–5. The heating bands 152 heat the feeding portion 54 to a first predetermined temperature. Likewise, the heating bands 154 heat the blending portion 56 to a second predetermined temperature, and the heating bands 156 heat the extruding portion 58 to a third predetermined temperature.

The heating bands 152, 154 and 156 are coupled to heater controller 158 which is capable of energizing the heating bands 152, 154 and 156 to heat barrel 28 the first, second and third predetermined temperatures, respectively. The heater controller 158 comprises a third sensing means or a third sensor for sensing the actual temperature of the feeding portion 54, blending portion 56 and extruding portion 58, respectively, of barrel 28. The heater controller 158 also comprises display means or a display consisting of displays 160 (FIG. 2) for displaying the actual temperature sensed by heater controller 158. The heater controller 158 is coupled to controller 32 which may also control the operation of heater 150 in heating bands 152, 154 and 156. In the embodiment being described, the first predetermined temperature associated with the feeding portion 54 ranges from 300 to 500 degrees Fahrenheit, depending on the molding materials 14 being used. Likewise, the second and third predetermined temperatures may also range from 300 to 500 degrees Fahrenheit. Although these ranges are shown, they are not meant to be limiting and other ranges may be appropriate, depending upon the molding materials 14 and desired or predetermined billet characteristics being used.

Although not shown, the barrel 28 and heating bands 152, 154 and 156 may be insulated to facilitate minimizing heat loss in barrel 28.

The heating means may also include the preheater 48, a knife blade heater, and a mold heater 182, to facilitate providing one thermal rise. In the embodiment being described, the mold heater 182 may comprise Model Nos. S-8412 or 3412 Sterl-Tronic Temperature Control manufactured by Sterl Co. of Milwaukee, Wis. Furthermore, a screw heater (not shown) may also be provided to heat screw 30 to further facilitate heating the molding materials 14 in barrel 28.

The plasticator 12 also comprises a separator or knife assembly 162 (FIGS. 14 and 15) for separating the molding materials 14 to provide the billet 16. The knife assembly 162 is associated with the extruding ends 28b of barrel 28 and comprises a pair of L-shaped mounting brackets 164 and 166 which define a channel 168. The knife assembly 162 also comprises the knife blade or knife 120 which is slidably mounted in channel 168. The knife blade 120 is coupled to knife driver 118 which is capable of driving the knife from the closed position in FIG. 14 to the open position in FIG. 15 and vice versa. The knife driver 118 comprises a push/pull type cylinder in the embodiment being described which is coupled to pressure valve 112 which in turn is coupled to controller 32 as mentioned previously herein.

The knife assembly 162 comprises a pair of switches 170 and 172 which cooperate with a trigger bar 174 located on knife blade 120. The trigger 174 triggers switch 170 to generate a closed signal when the knife 120 is in the closed position. Likewise, the trigger 174 causes switch 172 to generate an open signal when the knife 120 is in the open position. The switches 170 and 172 are coupled to controller 32 which receive the open and closed signals.

It should be appreciated that due to the proximal location of the knife 120 to the extruding end 28b of barrel 28 and die 50, the knife 120 becomes heated to approximately the same temperature as the extruding portion 58 of barrel 28. Note also that when the knife 120 is in the closed position, it seals the passageway 52 (FIGS. 3 and 4) of barrel 28 so that the molded suspension of molding materials 14 can be forced against the barrel side 120a (FIG. 3) of knife 120. Although not shown, the knife 120 may also be provided with the knife heater mentioned above which would be coupled to controller 32 to facilitate heating the knife 120 to a predetermined knife blade temperature which would generally correspond to the third predetermined temperature.

The system 10 comprises press 18 (FIG. 1) which comprises a press driver 176 which is coupled to a press controller 178 which may also be coupled to controller 32. The press controller 178 may energize press driver 176 to drive platform 180 from an open or non-molding position shown in FIG. 1 to a closed or molding position (not shown). As illustrated in FIG. 1, platform 180 may have a mold member 20a which cooperates or mates with a complementary mold member 20b to mold the part. In the embodiment being described, the press 18 is a compression press like the 250 ton Bipel Press, manufactured by Bipel of England, and the press controller 178 may be a controller provided by Allen Bradley which may be coupled to controller 32.

The press 18 also comprises the mold heater 182 mentioned above which is coupled to press controller 178 and which is capable of controlling the temperature of the mold members 20a and 20b when they are molding the part. In the embodiment being described, the mold heater 182 can vary the temperature of the mold members 20a and 20b from approximately 30° F. to 350° F. depending on the molding materials 14 being used. It is to be noted that the press 18 is a compression press which includes a pressure regulator 184 for regulating the pressure delivered to the billet 16. In the embodiment being described, the pressure can vary from 0 psi to 4000 psi. The press 18 also comprises a pressure gauge 186 and timer 188 for displaying the pressure and mold time, respectively, during corresponding operation of the press 18.

The system 10 also comprises conveyance means or a conveyance system 190 (FIG. 1). The function of the conveyance system 190 is to position billet 16 in mold member 20b after billet 16 is extruded from the extruding end 28b of barrel 28. In this regard, the conveyance system 190 may be any suitable means for conveying the billet 16 directly into the press 18, such as robotic arm, a hydraulic cylinder, a pneumatic cylinder, an electronic or mechanical conveyor or any other suitable means for causing billet 16 to be positioned in press 18. Furthermore, the conveyance system 190 may also comprise means for conveying or positioning the plasticator 12 in operative relationship with the mold member 20b such that when the billet 16 is extruded from barrel 28, it drops directly onto mold member 20b. In this regard, the conveyance system 190 may comprise a wheel, shuttle and track arrangement (not shown) onto which the plasticator 12 may be positioned such that the plasticator 12 may be slidably moved towards and away from press 18. For example, the shuttle and track system would be coupled to controller 32 so that when the press 18 moves to the open position shown in FIG. 1, the extruding end 28b of barrel 28 is moved into operative relationship underneath platform 180, such that when the billet 16 is extruded, it becomes positioned on mold member 20b as shown in FIG. 1. The plasticator 12 may then be moved or shuttled away from press 18 and the platform 180 driven downward (as viewed in FIG. 1) to mold the part. After the part is molded, it may be removed from the press 18 and, during such removal, the plasticator 12 may again be shuttled or moved to extrude the next billet 16 onto mold member 20b. Other variations of moving the plasticator 12 may also be used. For example, the conveyance system 190 may cause the plasticator 12 to withdraw from press 18 slowly so that the billet 16 is extruded substantially evenly over the length of the mold member 20b when the billet 16 is placed in the mold.

Figure 16A:
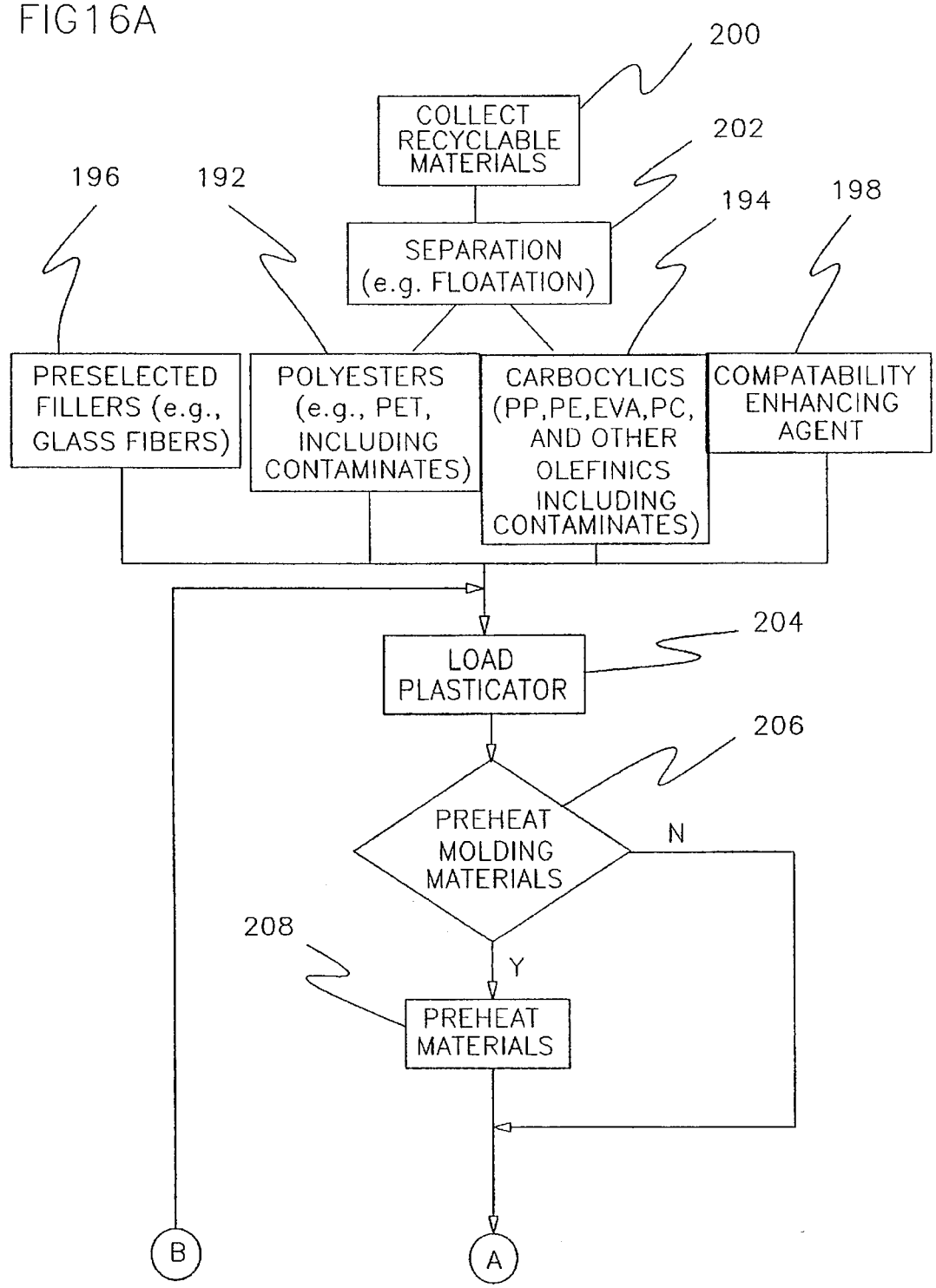

The molding materials 14 are preferably comprised of a polyester 192, a carbocylic or other carbocylics 194 and a preselected filler 196 (FIGS. 1, 16a and 16b). In the embodiment being described, the polyester 192 may include polyethylene terephthalate (PET), and the carbocylics 194 may be an olefinic such as polycarbonate, polypropylene (PP), polyethylene (PE) or ethylene vinyl acetate (EVA).

The preselected reinforcement or filler 196 may comprise a reinforcing fiber, glass fiber, fly ash, clay, carbon or graphite fiber, shredded reinforced fiber composite material, or like materials. It has been found that this apparatus and method can use fibers introduced to plasticator 12 with the other molding materials 14, without the fibers incurring significant damage. It should be appreciated, however, that this apparatus and system could be used with reinforced fibers, such as glass fibers, which range from the smallest available to as long as 6 inches.

A compatibility enhancing agent or agents 198 may also be included as one of the molding materials 14 which is added into feed hopper 36. It should be appreciated that the polyesters 192, carbocylics 194, preselected fillers 196 and compatibility enhancing agents 198 may take any suitable form which is capable of being received in the feed hopper 24, such as the form of chips, pellets, flakes and fibers. In addition, reinforcing fiber may take the form of single strands, shavings, mats, edge trimmings or shreddings as may be contained in shredded or reground reinforced composites containing such fibers in an existing polymer matrix. In other words, an existing thermoplastic polymer matrix having one or more of the above molding materials 14 may be, for example, shredded and used.

The compatibility enhancing agent or agents 198 are heat activated and are chosen so as to enhance the compatibility of the thermoplastic polymers, such as glass or glass fibers, and any other reinforcements or fillers which may be added. For example, olefinic polymers grafted with polar functional moieties such as acrylic acid or maleic anhydride may be mentioned. In this regard, the "Polybond" products available from BP Chemicals are presently preferred for use.

Preliminary studies have indicated that "Polybond" product grades 1000, 1001, 1002 and 1003 are suitable compatibility enhancing agents 198 that may be added to the thermoplastic polymers and fillers 196. These particular "Polybond" products are polypropylene based coupling agents grafted with CA. 6% acrylic acid. The only difference between these 4 grades of "Polybond" materials is in the melt flow rate "mfr". These range from 100 g/10 min. ("Polybond" 1000) to 12 g/10 min. ("Polybond" 1003). The skilled artisan can choose the particular desired mfr based upon the identity of the materials fed to the plasticator 12 and the initial processing viscosity thereof desired. Other exemplary compatibility enhancing agents 198 include "Polybond 1009 and 3009", both available from BP Chemicals. These polymers can be described as having high density polyethylene backbones grafted with either acrylic acid or maleic anhydride. The 1009 product is grafted with CA. 6% acrylic acid having a melt index of 6 g/10 min. while "Polybond" 3009 is grafted with about 2% maleic anhydride and has a melt index of about 6 g./10 min.

Other "Polybond" products can also be mentioned as being exemplary. These include the polypropylene based polymers grafted with varying amounts of maleic anhydride. For example, "Polybond" 3001 is described as a polypropylene polymer with grafted maleic anhydride branches present at a level of about less than ¼%. This product exhibits a melt flow rate of about 5 g./10 min. "Polybond" 3002 is also exemplary and is similar to the 3001 product except that its maleic anhydride content is about twice as high and that it exhibits a MFR of 7 g./10 min.

Additionally, free radical generating polymerization catalysts such as peroxides may be admixed with ethylenically unsaturated acids or anhydrides and used herein as compatibility enhancing agents.

Other exemplary compatibility enhancing agents include the "EPOLENE" polymers available from Eastman Chemical and other experimental nucleating agents also available from Eastman and that are specifically formulated for polyester rather than olefins.

The compatibility enhancing agent 198 which are normally fed to the feed hopper 36 in an amount of 1 to 10 (% by weight) based upon the weight of the thermoplastic polymeric material used.

An advantage of the system 10 is that it is capable of handling post consumer molding materials or molding materials which have a relatively high degree of contamination. For example, the molding materials 14 may be commingled or contaminated polymeric material as typically found in the post consumer waste stream. While the nature of contaminants and the percent of occurrence varies from lot to lot as a natural feature of waste materials, they do, on average, typically contain similar materials and in similar quantities. For example, post consumer polyesters (collected in the waste stream as PET) used in this process may contain 90% PET, 5% HDPE, 2% PP, 0.5% EVA and the remainder contaminants, including such things as miscellaneous paper and aluminum scrap.

The invention will now be described with reference to a number of specific examples which are to be regarded solely as illustrative and not as restricting the scope of the invention.

EXAMPLE 1

First, molding materials were used without the compatibility enhancing agent 198. Sixty (60) parts of a mixed post consumer polymer batch comprising PET, HDPE, PP and ethylene vinyl acetate (EVA) and 40 parts of scrap (landfill destined) glass fiber edge trimmings having nominal 2 inch fiber lengths were charged to the single reciprocating screw plasticizer shown in FIG. 1. Compounding the billet 16 occurred in a single thermodynamic cycle with a temperature rise to 430 degrees Fahrenheit for a period of 30 seconds, at which time the resulting mixed and molten bulk molding billet 16 was delivered to the press where a 6"×9" sample, 0.150 inch thick, was molded at a pressure of 3000 psi. The molded billet 16 was subjected to physical property tests and was found to exhibit a flexural strength of 10,300 psi, a flexural modulus of 700,000 psi and a notched IZOD of 0.43. These characteristics are representative of a strong but brittle material considered to have minimum desirability in product fabrication.

EXAMPLE 2

A mix of one-half post consumer polyethylene terephthalate (PET) derived from soft drink bottles and one-half shredded scrap from a 40% glass reinforced polypropylene composite material resulting in short chopped glass lengths was charged to the plasticizer 12 shown in FIG. 1. Compounding in the barrel 8 occurred at 500 degrees Fahrenheit to 550 degrees Fahrenheit for a time period of 60 seconds. The sample was tested and exhibited an average 12,500 psi flexural strength, a 435,000 psi flexural modulus, and a notched IZOD of 5.7 ft.-lbs./inch. This represents a material with performance satisfactory for a wide range of product uses.

EXAMPLE 3

Another example includes the use of the compatibility enhancing agent 198. Sixty (60) parts of a mixed (commingled and contaminated) post consumer polymer batch and 40 parts of scrap (landfill destined) glass fiber edge trimmings with nominal 2" fiber lengths were charged to the plasticizer 12 shown in FIG. 1. The polymer material was primarily PET, but also contained polycarbonate, HDPE, polypropylene, EVA and non-polymer material such as scrap from aluminum cans and paper. A compatibility enhancing agent 198 (Polybond 3009) was added to the mix in the plasticizer 12 at a ratio of 3% by weight based upon the weight of polymeric material fed. The first, second and third predetermined temperatures were set at 490 degrees Fahrenheit, 520 degrees Fahrenheit, 530 degrees Fahrenheit, respectively, in the feeding plasticating area, and 540 degrees Fahrenheit in the delivery area. The knife head 96 was set to 550 degrees Fahrenheit. The distance sensor was set a 110 mm. The plasticizer 12 was operated with a screw speed of 20–40 rpm and cylinders 88 and 90 were set at 300 psi such that pressure of 50 psi building to 300 psi resulted in the reciprocating screw 42 being pushed by barrel back pressure to the 110 mm position. At this time (after about three total minutes from introduction of materials to the plasticizer 12), a mixed and molten billet 16 was then delivered to the press 18 with mold faces 20a and 20b thereof heated to 80 degrees Fahrenheit. A 6"×9" sample, 0.150 inch thick, was then molded at a pressure of 3,000 psi. The sample was tested and exhibited a flexural strength of 20,310 psi, a flexural modulus of 980,000 and a notched IZOD of 3.03 ft.-lbs./inch. This material would be suitable for a wide range of product applications having strength and modulus properties analogous to commercially available and widely used glass reinforced thermoplastic sheet materials.

A method and process for using system 10 and for creating in billet 16 for molding a part will now be described. First, a post-consumer recyclable plastic, such as PET, polypropylene, polyethylene and ethylene vinyl acetate are collected as shown at step 200. If desired, these recyclable polymers may be separated (for example) by flotation separation (as shown in block 202). The contaminated polyesters 192 and carbocylics 194 along with the preselected reinforcements and fillers 196 are loaded into feed hopper 36 (FIG. 1) of plasticator 12 as shown in block 204. As mentioned earlier herein, the compatibility enhancing agent 198 may also be added at this time, if desired.

It may be desirable to preheat the molding materials (block 206), in which case controller 32 energizes preheater 48 to preheat the molding materials 14 (block 208) to approximately 100° to 350° F., depending on the molding materials 14 selected. Controller 32 then energizes second drive motor 42 to rotatably drive agitator 40 to begin mixing the molding materials 14 in feed hopper 36.

At block 210 a billet 16 is plasticized. Depending upon the part being molded, the predetermined characteristics of billet 16 are determined. Thus, the volume, density and length, for example, of billet 16 are determined. Once determined, the variable pressure regulator 117 associated with cylinders 88 and 90 is adjusted to a pressure which generally corresponds to the billet characteristics selected. In addition, one or more of the contact switches 140 of distance sensor 134 are adjusted to correspond to the length and volume of the billet 16 desired. In addition, the variable pressure regulator 117 associated with drive motor 92 is also adjusted so that drive motor 92 drives screw 30 at an appropriate rpm. The controller 32 is also programmed with the first, second and third predetermined temperatures so that heating controller 158 energizes the plurality of heaters 152, 154 and 156 to heat the feeding, blending and extruding portions 54, 56 and 58 to the appropriate temperature. For purposes of illustration only, it will be assumed that the pressure regulator 117 was set at 300 psi, the power system 96 pressure was set at 1000 psi, and the pressure regulator associated with drive motor 92 was set at 25 rpm, with contact switch 140 being set at approximately 110 millimeters.

The molding materials 14 are then introduced to the feeding opening 46 (FIG. 4). As best illustrated in FIGS. 4–10, controller 32 energizes drive motor 92 of screw drive system 75 to rotatably drive screw 30 such that the molding materials 14 are gradually blended together into a mixed molten suspension period.

The molding materials 14 are heated to approximately the first predetermined temperature when they are introduced between feeding portion 54 of barrel 28 and feeding section 60 of screw 30. Note that, due to depth 72 (FIG. 3) and pitch of the flights of the first plurality of threads 66, the molding materials 14 start to become blended such that the reinforcing fibers, like glass fibers, are not damaged. As screw 30 rotates in the direction of arrow 31 in FIG. 5, the molding materials 14 are forced from the feeding section 60 of screw 30 to the blending section 62 which is associated with blending portion 56 of barrel 28 when the screw 30 is in the home position shown in FIGS. 3 and 4. Notice also that because of the taper of the core 30a of screw 30, the molding materials 14 become blended into a more homogeneous suspension at the blending section 62 where the suspension is heated to approximately the second predetermined temperature mentioned earlier herein. To further facilitate the mixing and blending of the molding materials 14, the screw 30 may be provided with a blending section 62 having a second plurality of threads 68 (FIG. 4) with a pitch which is generally smaller than the pitch of the first plurality of threads 66. Varying the number of threads per inch, pitch of threads and thread depth facilitates accurately controlling the suspension and blending time of the molding materials 14, controlling the volume and density of billet 16, and controlling the velocity at which the molding materials 14 are plasticated.

Figure 6:
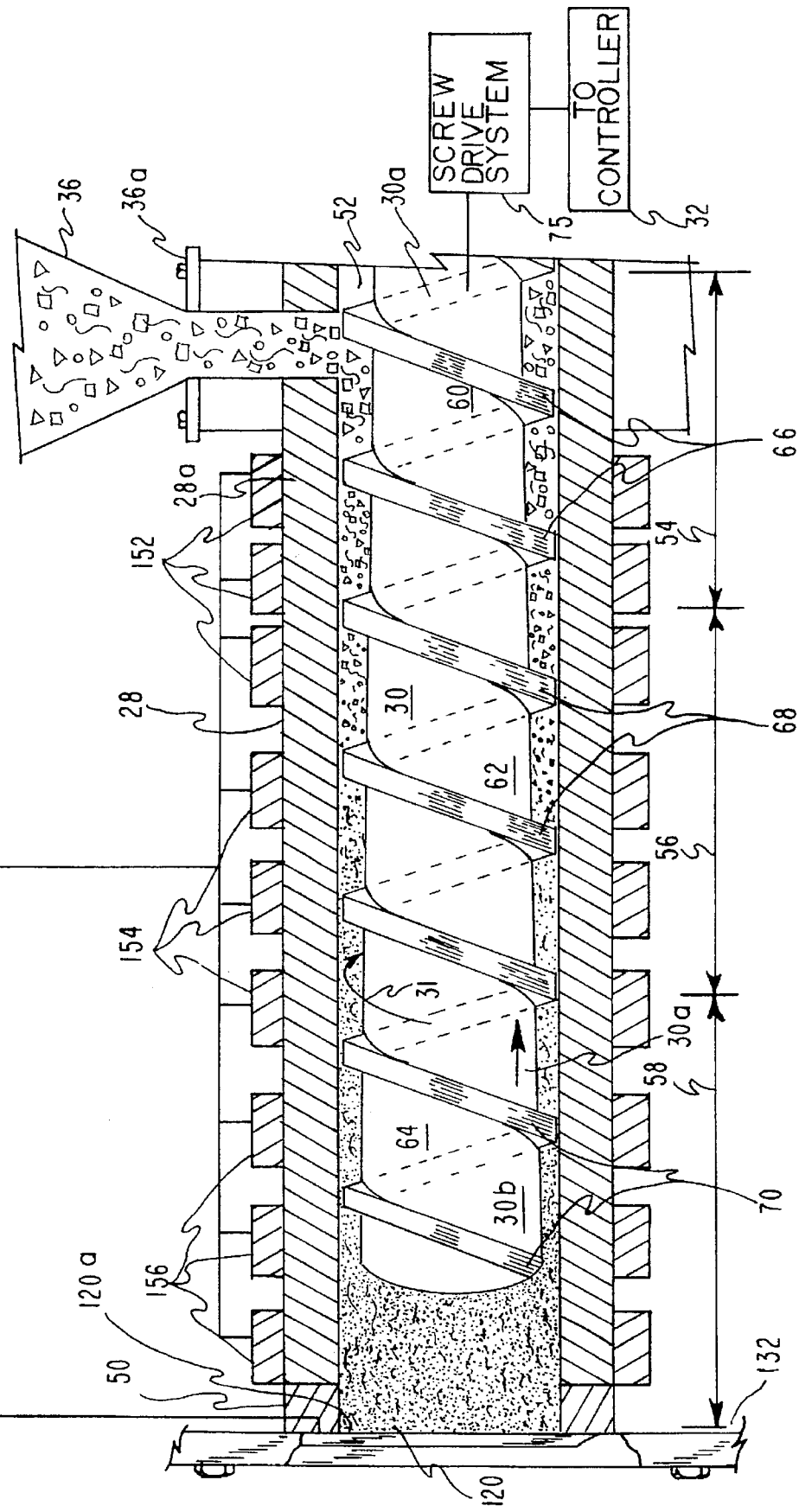
FIG. 6 is a sectional view similar to FIG. 5 showing the screw withdrawing from a passageway in the barrel.

As the screw drive system 75 continues to drive screw 30 as mentioned above, the mixed suspension is forced toward the storage area 124 associated with the extruding portion 58 of barrel 28. In the storage area 124, the molten suspension is collected, further blended and heated to approximately the third predetermined temperature. The mixed molten suspension ultimately engages the side 120a (FIG. 5) of knife 120 and begins forming billet 16 as shown in FIG. 6. As the molten suspension continues to collect in storage area 124, the pressure begins to build.

Figure 7:
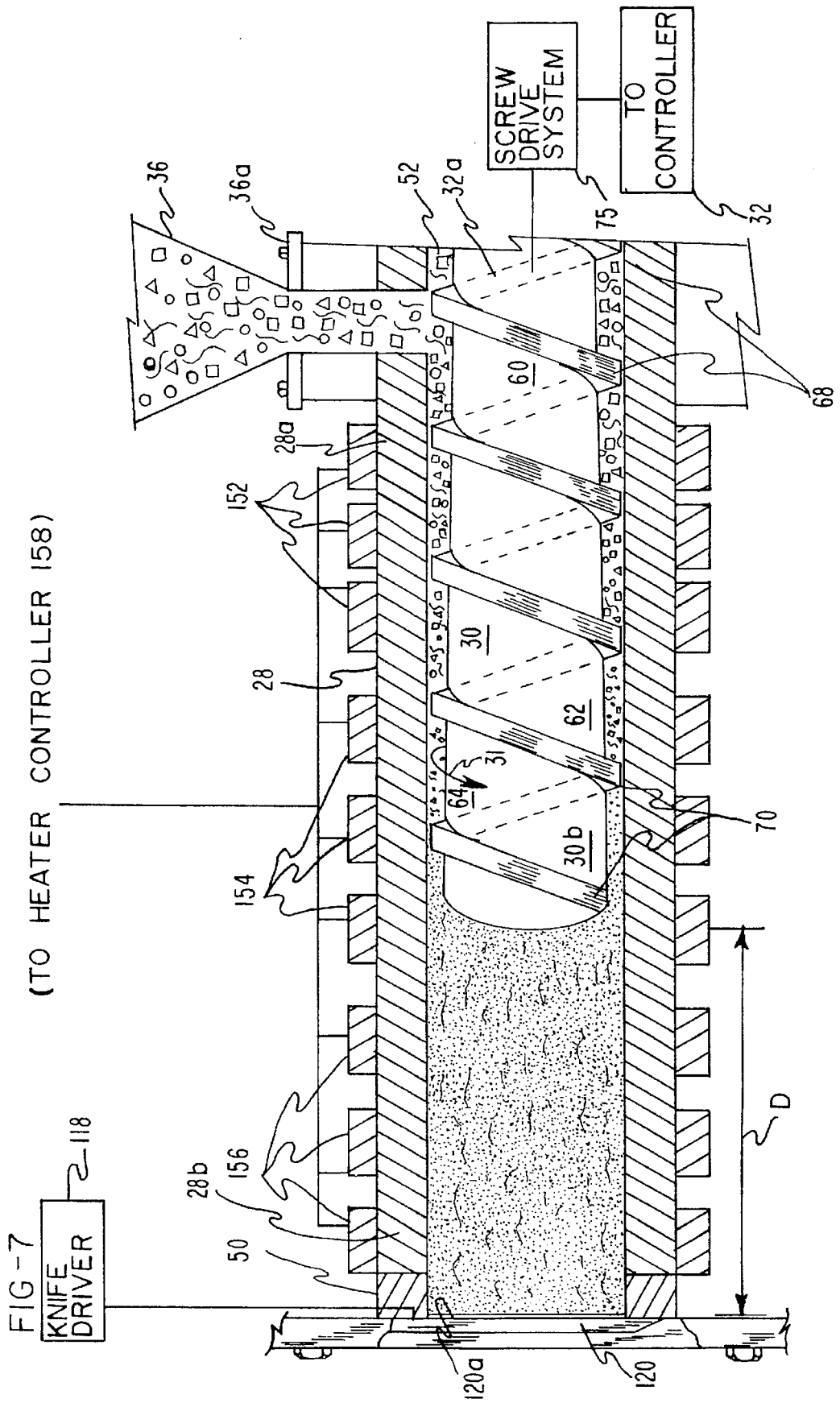
FIG. 7 is another view showing the screw withdrawing further from the passageway in the barrel.
Figure 8:
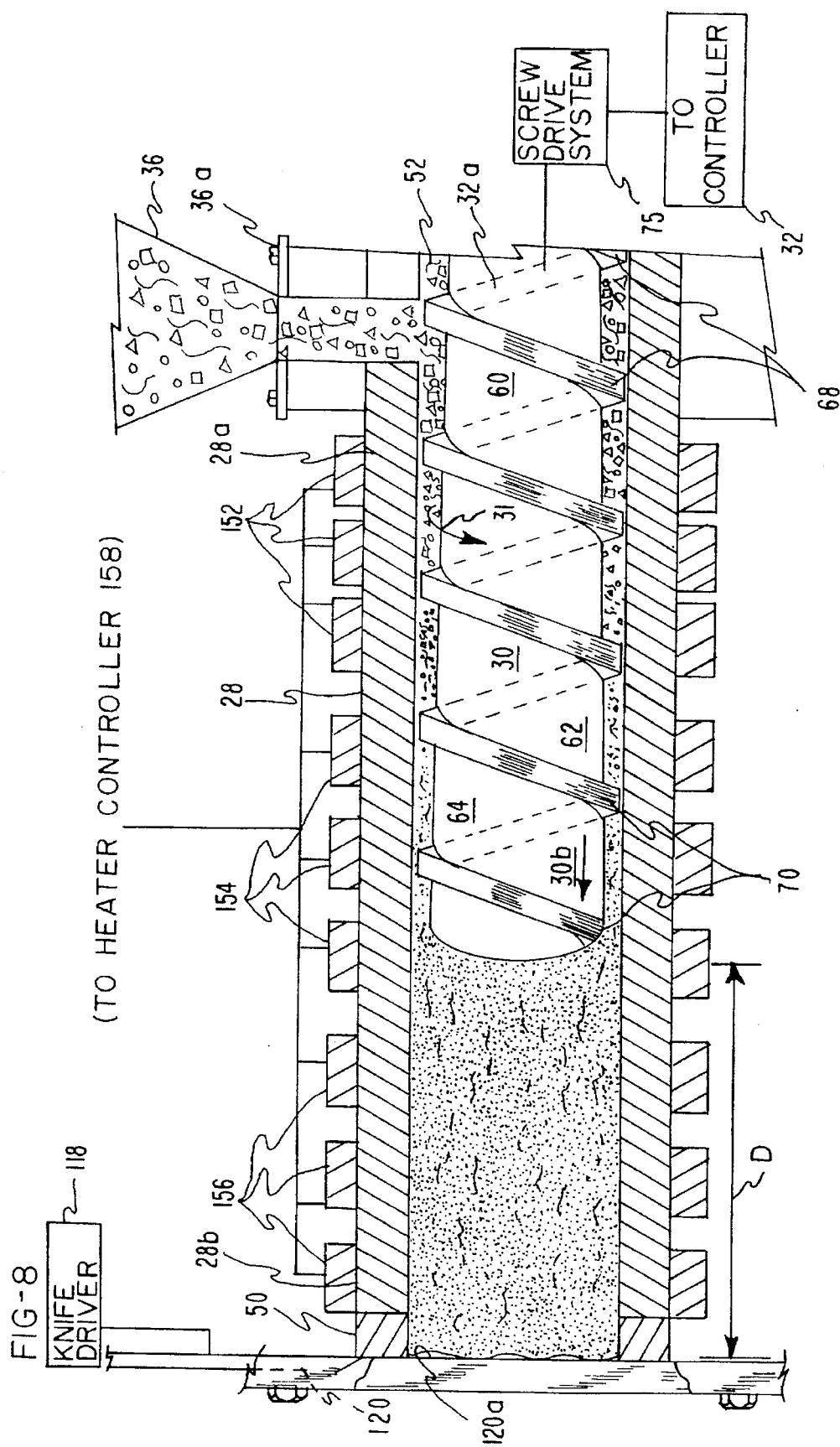
FIG. 8 is a view similar to FIG. 7 showing a knife blade in an open position.
Figure 9:
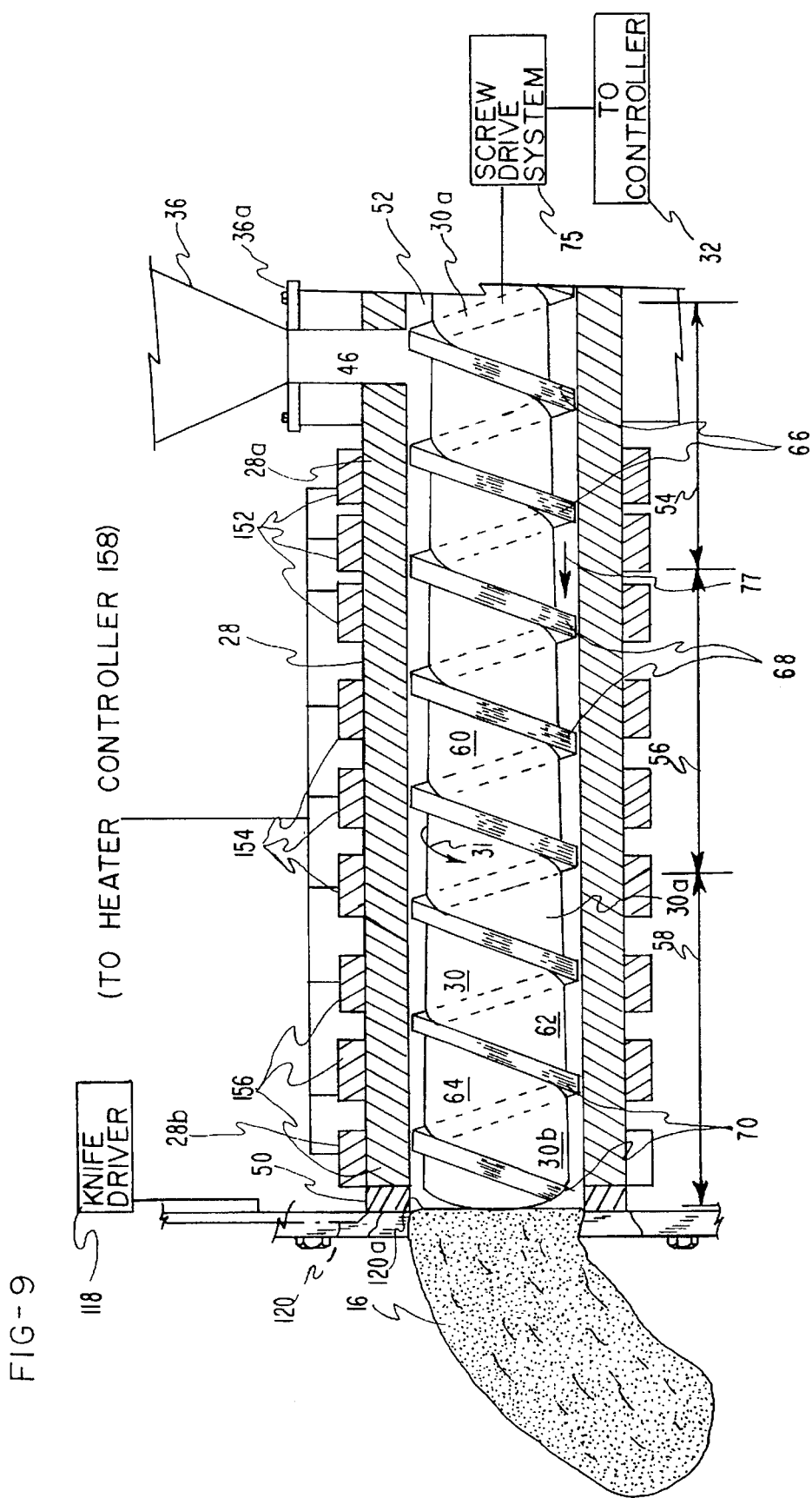
FIG. 9 is a view showing the screw acting as a plunger and forcing the mixed suspension of molding materials out of an extrusion end of the barrel.
Figure 10:
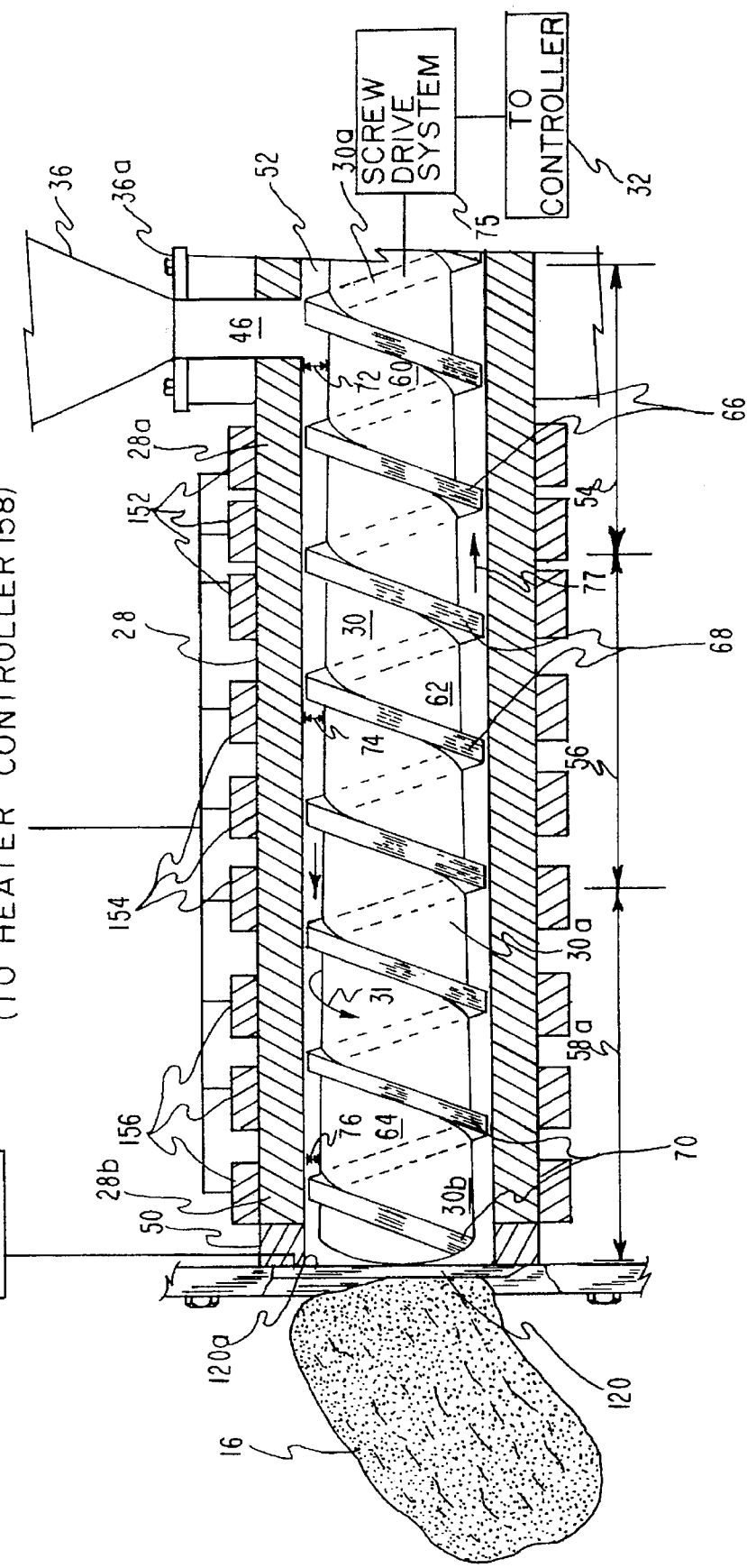
FIG. 10 is a view similar to FIG. 9 showing the knife in the closed position, thereby severing the mixed suspension of molding materials to provide a billet.

As the pressure approaches or exceeds 300 psi (i.e., the pressure applied to cylinders 88 and 90) the biasing pressure of cylinders 88 and 90 is overcome and the screw 30 begins withdrawing from passageway 52, thereby causing slidable block 78 to move in the direction of arrow 122 (FIG. 1). As shown in FIGS. 6–8, the molten suspension begins building in the storage area 124. The slidable block 78 moves in the direction of arrow 122 until contact switch 140 contacts switch 138 to generate the distance signal which is received by controller 32. Controller 32 then energizes pressure valves 114 and 116 to stop drive motor 92. Controller 32 also energizes pressure valve 110 to energize knife drive 118 to cause knife blade 120 to move from the closed position (FIGS. 8 and 14) to an open position (FIGS. 9 and 15). Controller 32 then energizes pressure valves 108 and 110 to actuate cylinders 88 and 90 to pull slidable block 78 in a direction opposite arrow 122, thereby causing the molten suspension to be extruded through extruding opening 132 (FIGS. 9 and 15). Controller 32 may then energize pressure valve 112 to actuate knife driver 118 to force knife blade 120 into the closed position, thereby separating the molten suspension to provide billet 16.

Although not shown, it should be appreciated that the controller 32 may cause the screw drive 74 and knife assembly 162 to provide a plurality of billets 16 during a single stroke length of the cylinders 88 and 90.

The billet 16 may then be conveyed (block 212 in FIG. 16) to mold member 20b in press 18 by the conveyance system 190 (FIG. 1). Other materials, such as sheet coating material or reinforcement material may be prepositioned (block 211) in the lower mold member 20b prior to introducing billet 16 into the mold member 20b. Once located in the press 18, controller 32 may energize press controller to, in turn, energize press driver 176 to drive platform 180 downward (as viewed in FIG. 1) to cause the part to be molded. In the example being described, the press heater 182 heats the molding members 20a and 20b to approximately 80 degrees Fahrenheit. In addition, the press 18 is set to compress billet 16 at approximately 3000 psi with a controlled pressure gradient.

At block 214 (FIG. 16b), the part is then molded by press 18.

As shown in decision block 216, it may be desirable to perform a second operation on the part before it is removed from the press 18 or when the billet 16 is molded. If such an operation is desired, it is conducted (block 218) and then the part is removed from the press 18 (block 220). In this regard, a second operation may comprise painting or otherwise placing a coating on the part, hot stamping a decal on the part, partially assembling the part, or molding or embossing a symbol on the part. If a second operation is not performed on the part, the part is removed from the press 18 at block 222.

Note that it may be desirable to integrally mold a surface texture or finish to the part during the molding process. For example, a plastic sheet or film, such as the Teslin sheet, manufactured by PPG Industries of Pittsburgh, Pa., may be integrally molded into the surface of the part. For example, if the plastic sheet was selected, it would be cut to the dimensions of the mold and placed in the mold prior to molding. The side of the sheet which contacts the mold may be coated with an acrylic finish to prevent the sheet from adhering to the mold during the molding process. After the sheet is placed in the mold, the billet 16 can be placed on the sheet and the part molded as described. If desired, a sheet could be placed on both mold members 20a and 20b before billet 16 is placed on mold member 20a. The billet 16 would then be placed on the sheet and molded as described above. This facilitates producing a part having a desired surface texture or finish on both sides. It is to be noted that, after the molding process, the polymer sheet is integral with the part.

It should be appreciated that other types of materials may be integrally molded into the part or into the surface of the part. For example, wood veneer sheets, burlap, or metal wire mesh may be molded into the part or into the surface of the part.

Returning to block 224 in FIG. 16b, once the molding process is completed and the part is removed from the press, the process can be repeated for another part. At block 226, subsequent operations, such as additional graphics, sheet material or printing, assembly, packaging and the like may be performed on the part.

Advantageously, this invention provides a system and method for using relatively highly contaminated post-consumer polyesters and carbocylics (such as olefinics). The system and method also facilitates evenly mixing reinforced fibers having a length of 2.0 inches or more, without damaging the fibers during the compounding, plasticating, extrusion and compression molding process.

Such post-consumer scrap would normally require additional cleaning and separation before use. This invention provides an apparatus and process for using the contaminated post-consumer materials to produce a part which has physical, chemical and mechanical properties similar to non-recycled materials.

Further, the method and apparatus provides a system for molding the molding materials 14 into a part using only a single thermal heat rise by controlling, coordinating and sequencing the temperature rise of the molding materials 14 as they go through the system 10. Using the single thermal heat rise facilitates enhancing the molecular orientation of the polymers which, in turn, causes the resultant part to have enhanced strength characteristics when compared to other types of molding processes. Also, a single heat rise facilitates reducing the material degradation that occurs to thermoplastic materials when they are heated. Further, because the pressures in the press 18 are adjustable, the surface texture or finish or the resultant part can be controlled to enhance the aesthetic or functional appeal of the part.

The invention also provides a method and apparatus which is advantageous because it reduces or eliminates many of the intermediate handling and thermocycles from receipt of the post-consumer materials to the molding of the part.

The described method and apparatus may utilize compatibility enhancing agent 198 which promote chemical bonding, for example, by increasing the presence of hydroxyl groups and the reinforcing fibers while they aid in the dispersion of reinforcement within the molten suspension.

Finally, molecular orientation within the billet 16 is enhanced by controlling the compression pressures and temperatures in press 18.

Advantageously, it should be appreciated that long fiber length can be maintained by reducing the tortuous nature of the material path existing in many prior art devices and processes. This improvement of the path results from screw thread depths that allow fibers to move intact, allowing the screw to float on a film of molten material between itself and the barrel. The lack of small orifices in delivering the material through the plasticator 12 and the molding process allows forming without constraining the movement of fibers to form the part.

While the invention has been described with reference to certain specific embodiments, this description is merely illustrative, and is not to be construed as limiting the scope of the invention. Various other modifications and changes may occur to those skilled in the art without departing from the spirit and scope of the invention as defined by the appended claims.

We claim:

1. A plasticator for creating a billet of moldable material comprising:

a feeder for receiving a plurality of molding materials comprising a predetermined amount of a thermoplastic and reinforcing fibers; and a barrel coupled to said feeder for receiving said plurality of molding materials from said feeder;

a screw situated in said barrel, said screw being rotatably driveable to create a molten suspension in a storage area of said barrel while leaving a substantial number of said reinforcing fibers intact;

a heater associated with said barrel to heat said barrel to facilitate creating said molten suspension;

a driver for rotatably driving said screw to create said molten suspension in said storage area, said driver also being capable of axially driving said screw to force said molten suspension out of an extrusion end of said barrel after a predetermined pressure is applied to said billet; and a cutter associated with said extrusion end to close said extrusion end to facilitate defining said storage area of said barrel such that when said cutter is actuated to a closed position, said molten suspension is severed to provide said billet.

2. The plasticator as recited in claim 1 wherein said barrel comprises a heating portion, a blending portion and an extruding portion; said screw being rotatably mounted in said barrel.

3. The plasticator as recited in claim 1 wherein said cutter comprises a knife associated with said end of said barrel such that it engages and closes said extrusion end to facilitate defining said storage area.

4. The plasticator as recited in claim 3 wherein said heater comprises a plurality of heaters associated with said feeder and said barrel.

5. The plasticator as recited in claim 3 wherein said barrel comprises a heating portion, a blending portion and an extruding portion, said heater comprising a barrel heater capable of heating said heating portion, said blending portion and said extruding portion to a first temperature, a second temperature and a third temperature, respectively.

6. The plasticator as recited in claim 1 wherein said heater comprises a plurality of resistance bands located around said barrel.

7. The plasticator as recited in claim 5 wherein said first, second and third temperatures fall within a range of approximately 475°–575° F. when the molding materials include a thermoplastic polyester and 375°–475° F. when the molding materials are primarily thermoplastic polyolefin.

8. The plasticator as recited in claim 5 wherein said heater comprises a heater controller for sensing the actual temperature at said feeding, blending and extruding portions of said barrel and also for adjusting the heater to maintain approximately said first, second and third temperatures.

9. The plasticator as recited in claim 2 wherein said screw comprises a feeding section, a blending section and an extruding section;

said feeding section comprising a first plurality of threads having a feeding thread depth, said blending section comprising a second plurality of threads having a blending thread depth, and said extruding section having a third plurality of threads having an extruding thread depth;

said feeding thread depth being greater than said extruding thread depth.

10. The plasticator as recited in claim 1 wherein said screw comprises a feeding section, a blending section and an extruding section associated with said heating portion, blending portion and said extruding portion, respectively, of said barrel;

said feeding section comprising a first plurality of threads having a feeding thread depth, said blending section comprising a second plurality of threads having a blending thread depth, and said extruding section having a third plurality of threads having an extruding thread depth;

said second plurality of threads having a pitch which is generally smaller than the pitch of said first plurality of threads.

11. The plasticator as recited in claim 1 wherein said screw comprises a feeding end, an extruding end and a core which is generally tapered such that the depth of threads located at said feeding end are greater than the depth of threads located at said extruding end.

12. The plasticator as recited in claim 11 wherein said cutter includes a knife blade.

13. The plasticator as recited in claim 12 wherein said knife blade comprises a knife heater associated therewith for heating said knife blade.

14. The plasticator as recited in claim 1 wherein said driver permits said screw to axially retract from said barrel when said billet achieves a characteristic, said driver comprises a sensor for causing said screw to extrude said billet upon the occurrence of at least one preselected condition.

15. The plasticator as recited in claim 14 wherein said barrel is mounted to a stationary block, said driver comprising a slidable drive motor coupled to the screw for driving the screw in and out of the barrel, said sensor further comprises a distance sensor for measuring the distance said screw has axially traveled in said barrel.

16. The plasticator as recited in claim 1 wherein said driver comprises a drive motor coupled to the screw and a cylinder associated with the drive motor for axially driving the drive motor to cause the screw to move axially in the barrel.

17. The plasticator as recited in claim 16 wherein the drive motor and cylinder are hydraulic, said plasticator further comprising a power system for driving said cylinder and drive motor;

said power system comprising a cylinder pressure regulator and a drive motor pressure regulator for regulating the pressure delivered to said cylinder and drive motor, respectively.

18. The plasticator as recited in claim 17 wherein said driver comprises a plurality of pressure valves operatively coupled to said power system and said cylinder and hydraulic motor for controlling the fluid being delivered to the cylinder and drive motor.

19. The plasticator as recited in claim 1 wherein said plasticator further comprises:

a cutter driver coupled to said cutter for driving said cutter from an open to a closed position;

a controller capable of energizing said cutter driver to drive said cutter to an open position, and also being capable of energizing said cutter driver to drive said cutter to a closed position, thereby separating said molten suspension to provide the billet.

20. The plasticator as recited in claim 3 wherein said feeder comprises a feed hopper for receiving said plurality of molding materials;

said heater further comprises a preheater for preheating said molding materials to a temperature in said feed hopper.

21. The plasticator as recited in claim 1 wherein said feeder comprises an agitator and an agitator driver coupled to the agitator for rotatably driving said agitator to agitate said plurality of molding materials in said feeder.

22. The plasticator as recited in claim 1 wherein said plasticator further comprises a conveyance system for facilitating positioning the billet in a press.

23. The plasticator as recited in claim 1 wherein said thermoplastic is contaminated.

24. The plasticator as recited in claim 1 wherein said thermoplastic comprises an olefinic which is contaminated.

25. The plasticator as recited in claim 23 wherein said thermoplastic comprises an olefinic which is contaminated.

26. The plasticator as recited in claim 1 wherein said long reinforcing fibers are glass fibers which generally comprise a length of at least 2 inches.

27. The plasticator as recited in claim 1 wherein said molding materials further comprises a compatibility enhancing agent.

28. The plasticator as recited in claim 27 wherein said compatibility enhancing agent comprises a polypropylene coupling agent having at least 6% acrylic acid.

29. A plasticator for creating a billet from a plurality of molding materials, including long fibers, said plasticator comprising:

barrel means coupled to a feeder for receiving said plurality of molding materials from said feeder;

screw means rotatably mounted in said barrel means for mixing said plurality of molding materials to create a molten suspension in said barrel means while leaving a substantial number of said long fibers substantially undamaged;

heating means associated with said barrel for heating said barrel means to create said molten suspension;

drive means for rotatably driving said screw means to create said molten suspension in a storage area created by axial retraction of said screw means and also for axially driving said screw means to force said molten suspension out of an extrusion end of said barrel means after a predetermined pressure is applied to said billet;

control means for controlling and coordinating the operation of the plasticator in order to facilitate plasticating the billet and extruding the billet upon the occurrence of at least a preselected condition;

knife means associated with said extrusion end of said barrel means for closing said barrel means to facilitate defining said storage area and for severing said molten suspension to provide said billet.

30. The plasticator as recited in claim 29 wherein said screw means comprises a screw dimensioned to facilitate mixing said molding materials such that said long fibers remain generally intact.

31. The plasticator as recited in claim 29 wherein said screw means comprises a screw comprising a plurality of threads having a plurality of pitch distances.

32. The plasticator as recited in claim 29 wherein said screw means comprises a screw comprising a plurality of threads having a plurality of thread depths.

33. The plasticator as recited in claim 29 wherein said screw means comprises a screw comprising a plurality of threads having a plurality of thread depths.

34. The plasticator as recited in claim 29 wherein the control means comprises a controller for controlling and coordinating the operation of the plasticator in order to facilitate plasticating the billet to have the characteristic.

35. The plasticator as recited in claim 29 wherein said plasticator comprises control means coupled to said heating means for controlling the heat applied to said plurality of molding materials.

36. The plasticator as recited in claim 29 wherein said barrel means comprises a feeding end and an extruding end, said feeding end having a feed hopper associated therewith and said extruding end having said knife means associated therewith, said heating means comprising a plurality of heaters associated with said feed hopper, said barrel and said knife, said control means being capable of controlling the plurality of heaters in order to apply a plurality of temperatures to the molding materials as they are plasticated in the plasticator.

37. The plasticator as recited in claim 36 wherein at least one of said plurality of heaters is a resistance band.

38. The plasticator as recited in claim 29 wherein said plasticator comprises a controller capable of selectively energizing said drive means to rotatably and axially drive said screw.

39. The plasticator as recited in claim 38 wherein said drive means comprises a drive motor coupled to the screw means, at least one cylinder associated with the drive motor for driving the drive means and screw means to move axially, and a power system coupled to the controller for energizing said drive means and said cylinder;

said controller being capable of selectively energizing said power system to actuate said at least one cylinder and drive means.

40. The plasticator as recited in claim 39 wherein said cylinder, drive motor and power system are hydraulic;

said control means further comprising at least one variable pressure regulator for controlling the pressure delivered by the power system to the drive motor and cylinder.

41. The plasticator as recited in claim 29 wherein said knife means further comprises a hydraulic knife cylinder coupled to a knife blade thereto, said plasticator further comprising a controller coupled to said knife means for energizing said knife means to actuate said hydraulic knife cylinder to said closed position.

42. The plasticator as recited in claim 29 wherein the molding materials comprise an amount of a thermoplastic and said long fibers.

43. The plasticator as recited in claim 42 wherein said long fibers are glass fibers, said molding materials being provided in approximately the following proportions: 60% thermoplastic and 40% glass fibers.

44. The plasticator as recited in claim 43 wherein the molding materials comprise a compatibility enhancing agent.

45. The plasticator as recited in claim 43 wherein the compatibility enhancing agent comprises at least 6% acrylic acid.

46. The plasticator as recited in claim 44 wherein said thermoplastic is contaminated.

47. The plasticator as recited in claim 46 wherein said contamination comprises a contaminant from a contamination group, including HDPE, PP, EVA, paper and aluminum.

* * * * *

UNITED STATES PATENT AND TRADEMARK OFFICE
CERTIFICATE OF CORRECTION

PATENT NO. : 5,637,329
DATED : June 10, 1997
INVENTOR(S) : Abrams, et al.

It is certified that error appears in the above-indentified patent and that said Letters Patent is hereby corrected as shown below:

On the title page, item [62], please delete "1994." and insert --1994, Pat. No. 5,591,384.-- therefor.

On the title page, item [56], at line 16, please delete "Gaylrod" and insert --Gaylord-- therefor.

Column 1, at line 6, please delete "copending" and insert -- application-- therefor.

Column 1, line 7, please delete "08/220,906 filed Mar. 31, 1994." and insert --08/220,906, filed Mar. 31, 1994, now U.S. Pat. No. 5,591,384.-- therefor.

column 2, at line 45, please delete "said" and insert --the-- therefor.

column 2, at line 46, please delete "said" and insert --the-- therefor.

column 3, at line 8, please delete "said" and insert --the-- therefor.

column 3, at line 20, please delete "said" and insert --the-- therefor.

UNITED STATES PATENT AND TRADEMARK OFFICE
CERTIFICATE OF CORRECTION

PATENT NO. : 5,637,329
DATED : June 10, 1997
INVENTOR(S) : Abrams, et al.

It is certified that error appears in the above-indentified patent and that said Letters Patent is hereby corrected as shown below:

column 4, at line 19, please delete "FIG." and insert --FIGS.-- therefor.

column 7, at line 28, please delete "which is" and insert --which are-- therefor.

column 9, at line 55, please delete "30° F. to 350° F." and insert --30° F to 350° F-- therefor.

column 10, at line 3, please delete "as robotic" and insert --as a robotic-- therefor.

column 11, at line 42, please delete "olefins." and insert --olefins. EPOLENE is a trademark of Eastman Chemical.-- therefor.

column 11, at line 43, please delete "agent" and insert --agents-- therefor.

Signed and Sealed this

Twenty-eighth Day of October, 1997

Attest:

BRUCE LEHMAN

*Attesting Officer*      *Commissioner of Patents and Trademarks*